US011919306B2

(12) United States Patent
Nakayama

(10) Patent No.: US 11,919,306 B2
(45) Date of Patent: Mar. 5, 2024

(54) METHOD OF MANUFACTURING LIQUID JET HEAD CHIP, LIQUID JET HEAD CHIP, LIQUID JET HEAD, AND LIQUID JET RECORDING DEVICE

(71) Applicant: SII Printek Inc., Chiba (JP)

(72) Inventor: Hitoshi Nakayama, Chiba (JP)

(73) Assignee: SII PRINTEK INC., Chiba (JP)

( * ) Notice: Subject to any disclaimer, the term of this patent is extended or adjusted under 35 U.S.C. 154(b) by 66 days.

(21) Appl. No.: 17/542,845

(22) Filed: Dec. 6, 2021

(65) Prior Publication Data

US 2022/0176698 A1 Jun. 9, 2022

(30) Foreign Application Priority Data

Dec. 7, 2020 (JP) ................................ 2020-202681

(51) Int. Cl.
*B41J 2/14* (2006.01)
*B41J 2/16* (2006.01)

(52) U.S. Cl.
CPC ......... *B41J 2/14201* (2013.01); *B41J 2/1607* (2013.01); *B41J 2/164* (2013.01)

(58) Field of Classification Search
CPC ...... B41J 2/14201; B41J 2/1607; B41J 2/164; B41J 2/1609; B41J 2/1623; B41J 2/1632; B41J 2/1642; B41J 2/1606; B41J 2/16
See application file for complete search history.

(56) References Cited

FOREIGN PATENT DOCUMENTS

| | | | |
|---|---|---|---|
| EP | 3663091 | A1 | 6/2020 |
| JP | H10202859 | A | 8/1998 |
| JP | 2005-153510 | A | 6/2005 |

OTHER PUBLICATIONS

Machine Translation of "Ink Jet Head And Manufacturing Method Thereof" (JP 3812089), Aug. 23, 2006, [Paragraphs 0016-0034} (Year: 2006).*

Extended European Search Report in Europe Application No. 21212886.2, dated Apr. 29, 2022, 7 pages.

* cited by examiner

*Primary Examiner* — Lisa Solomon
(74) *Attorney, Agent, or Firm* — Crowell & Moring LLP

(57) ABSTRACT

The trouble of removing a protective film such as a polyparaxylene film from the part not requiring the protective film is reduced. A method of manufacturing a head chip according to an aspect of the present disclosure includes a substrate preparation step of preparing an actuator plate substrate having a jet channel communicated with a nozzle hole configured to jet ink, and a non-jet channel which does not jet the ink, and a protective film formation step of forming a protective film configured to protect a common electrode formed on an inner surface of the jet channel from the ink in a state in which the jet channel is exposed and the non-jet channel is covered after the substrate preparation step.

8 Claims, 18 Drawing Sheets

41

METHOD OF MANUFACTURING LIQUID JET HEAD CHIP, LIQUID JET HEAD CHIP, LIQUID JET HEAD, AND LIQUID JET RECORDING DEVICE

RELATED APPLICATIONS

This application claims priority to Japanese Patent Application No. 2020-202681, filed on Dec. 7, 2020, the entire content of which is incorporated herein by reference.

BACKGROUND OF THE INVENTION

1. Field of the Invention

The present disclosure relates to a method of manufacturing a liquid jet head chip, a liquid jet head chip, a liquid jet head, and a liquid jet recording device.

2. Description of the Related Art

In the past, there has existed an inkjet printer equipped with an inkjet head as a device for jetting ink shaped like a droplet to a recording target medium such as recording paper to thereby record an image and characters on the recording target medium.

For example, as the inkjet head, there exists a system which applies a voltage to a piezoelectric body such as PZT (lead zirconate titanate) to deform the piezoelectric body to thereby jet the ink. In order to achieve finer printing, there is adopted a method of increasing the density of the nozzle holes for jetting the ink. In this case, in order to increase the density, the plurality of channels and so on of the actuator plate (the structure of the head chip) are also made finer.

For example, a portion which makes contact with the ink as a liquid in the inkjet head is provided with a protective film such as a poly-paraxylene (parylene, a registered trademark) film to thereby ensure the durability. For example, the channels are provided with the poly-paraxylene film to thereby prevent electrodes formed inside the channels from being eroded by the ink. The poly-paraxylene film has an advantage of adhering to a complicated structure, and is therefore provided also to a part (a part not requiring the protective film) other than a necessary part in the channels and so on in some cases. For example, in JP-A-2005-153510, there is disclosed a method of removing the poly-paraxylene film provided to the part not requiring the poly-paraxylene film with oxygen plasma etching process.

In contrast, there is a method of covering the part not requiring the poly-paraxylene film with a masking member such as a tape in the deposition process of the poly-paraxylene film, and then removing the masking member using a physical method after forming the poly-paraxylene film.

However, when the poly-paraxylene film provided to the part not requiring the poly-paraxylene film is removed using the oxygen plasma etching process, ozone is generated in the removing process, and there is a possibility of exerting an influence on the poly-paraxylene film provided to the necessary part.

In contrast, when removing the masking member using a physical method after forming the poly-paraxylene film, there is a possibility that the poly-paraxylene film is broken in the removing process to cause fluffing.

In order to ensure the durability as described above, a peripheral area of the nozzle hole for jetting the ink becomes a part which requires the protective film such as the poly-paraxylene film. In contrast, an area other than the peripheral area of the nozzle hole includes an area to which an external board is coupled and so on, and therefore, becomes a part which does not require the protective film such as the poly-paraxylene film.

Therefore, it is required to save the trouble of removing the protective film such as the poly-paraxylene film from the part not requiring the protective film.

The present disclosure has an object of providing a method of manufacturing a liquid jet head chip, a liquid jet head chip, a liquid jet head, and a liquid jet recording device capable of saving the trouble of removing the protective film such as the poly-paraxylene film from the part not requiring the protective film.

SUMMARY OF THE INVENTION

In view of the problems described above, the present disclosure adopts the following aspects.

(1) A method of manufacturing a liquid jet head chip according to an aspect of the present disclosure includes a substrate preparation step of preparing an actuator plate substrate having a jet channel communicated with a nozzle hole configured to jet liquid, and a non jet channel which does not jet the liquid, and a protective film formation step of forming a protective film configured to protect an electrode formed on an inner surface of the jet channel from the liquid in a state in which the jet channel is exposed and the non jet channel is covered after the substrate preparation step.

According to the present aspect, by providing the protective film to the jet channel exposed in the state in which the non jet channel is covered, it is possible to prevent the protective film from being provided to the non jet channel. Since the non jet channel is a part which does not require the protective film, it is possible to save the trouble of removing the protective film on the part not requiring the protective film.

(2) In the method of manufacturing the liquid jet head chip according to the aspect (1) described above, it is preferable that the actuator plate substrate has a first surface on which a nozzle plate provided with the nozzle hole communicated with the jet channel is disposed, and in the protective film formation step, a mask having an opening part from which the jet channel is exposed is disposed on the first surface of the actuator plate substrate, and then, the protective film is provided to the jet channel through the opening part.

According to the present aspect, it is possible to prevent the protective film from being provided to the non jet channel with a simple method using the mask.

(3) In the method of manufacturing the liquid jet head chip according to the aspect (2) described above, it is preferable that the actuator plate substrate further has a second surface crossing the first surface, and in the protective film formation step, the mask is disposed so as to straddle the first surface and the second surface of the actuator plate substrate, and then, the protective film is provided to the jet channel through the opening part.

When the mask is supposedly disposed only on the first surface of the actuator plate substrate, there is a possibility that the protective film is provided to a part not requiring the protective film through a gap between the mask and the first surface. In contrast, according to the present aspect, since the gap is covered with the mask by disposing the mask so as to straddle the first surface and the second surface of the actuator plate substrate, it is possible to prevent the protective film from being provided to the part not requiring the protective film.

(4) In the method of manufacturing the liquid jet head chip according to one of the aspects (2) and (3) described above, it is preferable that in the protective film formation step, an intermediate plate having a communication hole communicated with the jet channel is bonded, as the mask, to the first surface of the actuator plate substrate, and then, the protective film is provided to the jet channel through the communication hole.

According to the present aspect, since the intermediate plate is a constituent of the liquid jet head chip, and it is possible to leave the intermediate plate without change after the protective film formation step, it is possible to prevent the protective film from being provided to the non-jet channel with a simpler method.

(5) In the method of manufacturing the liquid jet head chip according to the aspect (4) described above, it is preferable that the first surface of the actuator plate substrate has a nozzle peripheral area on a periphery of the nozzle hole, and a coupling area to which an external board is coupled, and in the protective film formation step, the protective film is provided to the jet channel through the communication hole in a state in which the intermediate plate as the mask is disposed in the nozzle peripheral area, and the coupling area is covered with a coupling area mask as the mask.

According to the present aspect, since the protective film is prevented from being provided to the coupling area, it is possible to prevent a coupling failure with the external board.

(6) In the method of manufacturing the liquid jet head chip according to the aspect (5) described above, it is preferable that in advance of the protective film formation step, a step part is provided to the intermediate plate in a region which separates the nozzle peripheral area and the coupling area from each other.

According to the present aspect, it is possible to perform the alignment with the coupling area mask using the step part. In addition, even when the fluffing of the protective film occurs when removing the coupling area mask, it is possible to prevent the fluffing from reaching the nozzle peripheral area. In addition, when manufacturing the liquid jet head, it is possible to perform the alignment with the nozzle plate using the step part.

(7) A liquid jet head chip according to an aspect of the present disclosure includes an actuator plate having a jet channel communicated with a nozzle hole configured to jet liquid, and a non-jet channel which does not jet the liquid, wherein the actuator plate has a protective film configured to protect an electrode formed on an inner surface of the jet channel from the liquid, and the protective film fulfills either one of (A) and (B) described below.

(A) The protective film is not provided to the non-jet channel.

(B) The protective film is provided to the non-jet channel, and a thickness of the protective film in the non-jet channel is smaller than a thickness of the protective film in the jet channel.

According to the present aspect, since the non jet channel is a part which does not require the protective film, it is possible to save the trouble of removing the protective film on the part not requiring the protective film.

(8) In the liquid jet head chip according to the aspect (7) described above, it is preferable that the protective film fulfills (A) described above.

According to the present aspect, there is no trouble of removing the protective film on the part not requiring the protective film. In addition, the problem of the fluffing of the protective film does not occur.

(9) In the liquid jet head chip according to the aspect (8) described above, it is preferable that the actuator plate has a nozzle peripheral area on a periphery of the nozzle hole, and a coupling area to which an external board is coupled, and the protective film is not formed in the coupling area.

According to the present aspect, it is possible to prevent the coupling failure with the external board.

(10) In the liquid jet head chip according to the aspect (9) described above, it is preferable that there is further included an intermediate plate which is bonded to the actuator plate, and has a communication hole communicated with the jet channel, wherein the intermediate plate has a step part in a region which separates the nozzle peripheral area and the coupling area from each other.

According to the present aspect, when manufacturing the liquid jet head, it is possible to perform the alignment with the nozzle plate using the step part.

(11) A liquid jet head according to an aspect of the present disclosure includes the liquid jet head chip according to any one of the aspects (7) through (10) described above.

According to the present aspect, since there is provided the liquid jet head chip according to the aspects described above, it is possible to provide the liquid jet head capable of saving the trouble of removing the protective film in the part not requiring the protective film.

(12) A liquid jet recording device according to an aspect of the present disclosure includes the liquid jet head according to the aspect (11) described above.

According to the present aspect, since there is provided the liquid jet head according to the aspect described above, it is possible to provide the liquid jet recording device capable of saving the trouble of removing the protective film in the part not requiring the protective film.

According to the aspect of the present disclosure, it is possible to save the trouble of removing the protective film such as a poly-paraxylene film from the part not requiring the protective film.

DETAILED DESCRIPTION OF THE PREFERRED EMBODIMENTS

Figure 1:
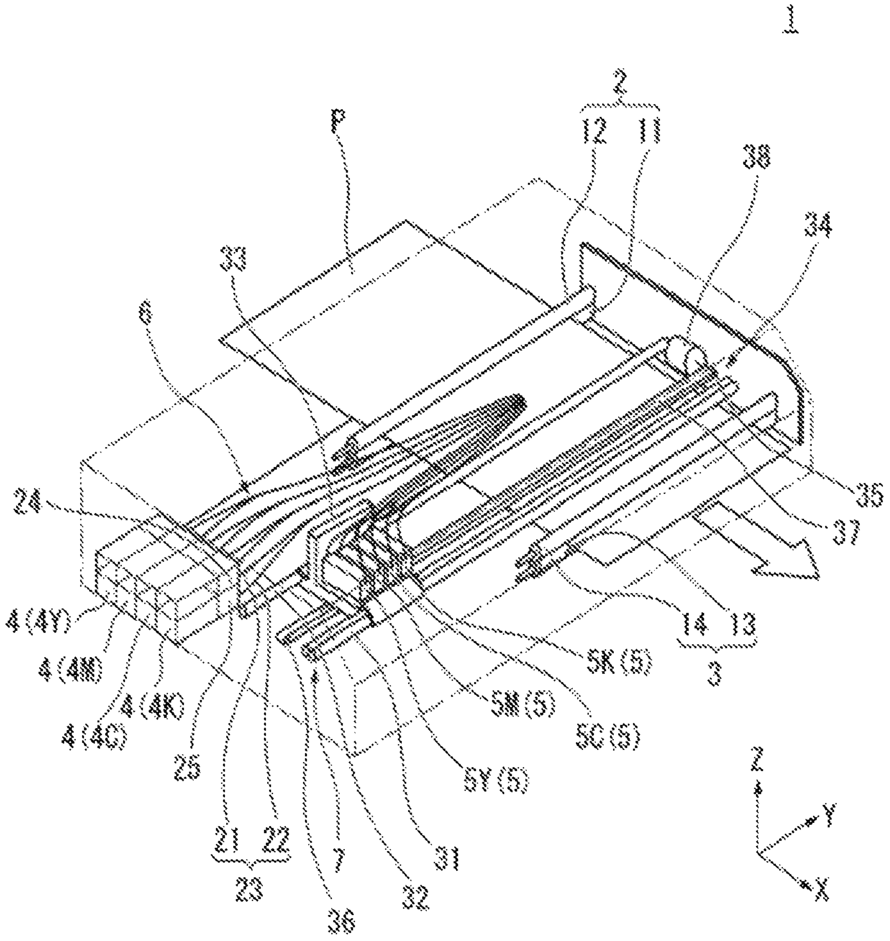
FIG. 1 is a schematic configuration diagram of an inkjet printer according to an embodiment.

An embodiment according to the present disclosure will hereinafter be described with reference to the drawings. In the embodiment and a modified example described hereinafter, constituents corresponding to each other are denoted by the same reference symbols and the description thereof will be omitted in some cases. It should be noted that in the following description, expressions representing relative or absolute arrangement such as “parallel,” “perpendicular,” “center,” and “coaxial” not only represent strictly such an arrangement, but also represent the state of being relatively displaced with a tolerance, or an angle or a distance to the extent that the same function can be obtained. In the following embodiment, the description will be presented citing an inkjet printer (hereinafter simply referred to as a printer) for performing recording on a recording target medium using ink (a liquid) as an example of a liquid jet recording device equipped with a liquid jet head provided with a liquid jet head chip (thereinafter referred to simply as a head chip) according to the present disclosure. It should be noted that the scale size of each member is arbitrarily modified so as to provide a recognizable size to the member in the drawings used in the following description.

[Printer]

FIG. 1 is a schematic configuration diagram of the printer 1.

As shown in FIG. 1, the printer 1 according to the present embodiment is provided with a pair of conveying mechanisms 2, 3, ink tanks 4, inkjet heads 5 (liquid jet heads), an ink circulation mechanism 6, and a scanning mechanism 7. It should be noted that in FIG. 1, a chassis of the printer 1 is represented by a dashed-two dotted line to thereby show the inside of the chassis.

It should be noted that in the following explanation, the description is presented using a Cartesian coordinate system of X, Y, and Z as needed. The X direction coincides with a conveying direction (a sub-scanning direction) of a recording target medium P (e.g., paper). The Y direction coincides with a scanning direction (a main-scanning direction) of the scanning mechanism 7. The Z direction represents a vertical direction (a gravitational direction) perpendicular to the X direction and the Y direction. In the following explanation, the description will be presented defining an arrow side as a positive (+) side, and an opposite side to the arrow as a negative (−) side in the drawings in each of the X direction, Y direction, and the Z direction. In the present specification, the +Z side corresponds to an upper side in the gravitational direction, and the −Z side corresponds to a lower side in the gravitational direction.

The conveying mechanisms 2, 3 (a first conveying mechanism 2 and a second conveying mechanism 3) convey the recording target medium P in the X direction (e.g., toward the +X side). Specifically, the first conveying mechanism 2 is provided with a first grit roller 11 extending in the Y direction, a first pinch roller 12 extending in parallel to the first grit roller 11, and a drive mechanism (not shown) such as a motor for making axial rotation of the first grit roller 11. The second conveying mechanism 3 is provided with a second grit roller 13 extending in parallel to the first grit roller 11, a second pinch roller 14 extending in parallel to the second grit roller 13, and a drive mechanism (not shown) for making axial rotation of the second grit roller 13.

There is disposed the plurality of ink tanks 4 arranged side by side in the X direction. In the embodiment, the plurality of ink tanks 4 consist of ink tanks 4Y, 4M, 4C, and 4K respectively containing ink of four colors of yellow, magenta, cyan, and black.

Figure 2:
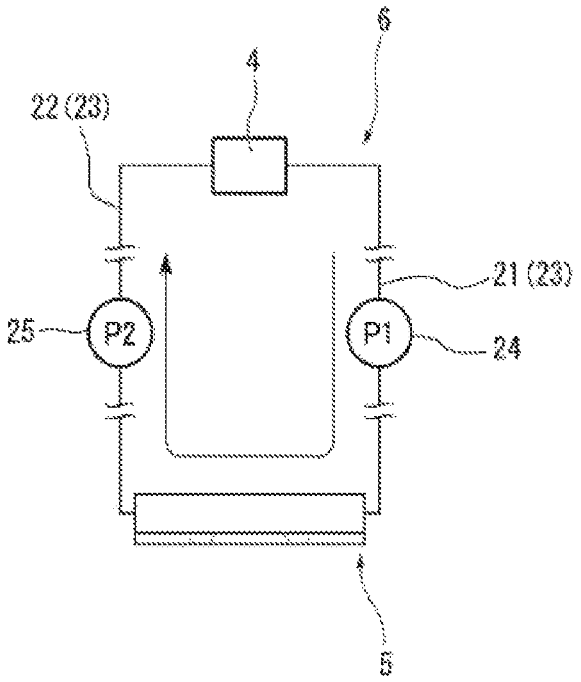
FIG. 2 is a schematic configuration diagram of an inkjet head and an ink circulation mechanism according to the embodiment.

FIG. 2 is a schematic configuration diagram of the inkjet head and the ink circulation mechanism.

As shown in FIG. 2, the ink circulation mechanism 6 circulates the ink between the ink tank 4 and the inkjet head 5. Specifically, the ink circulation mechanism 6 is provided with an ink supply tube 21 and an ink discharge tube 22 constituting a circulation flow channel 23, a pressure pump 24 coupled to the ink supply tube 21, and a suction pump 25 coupled to the ink discharge tube 22. For example, the ink supply tube 21 and the ink discharge tube 22 are each formed of a flexible hose having flexibility to the extent of being capable of following the action of the scanning mechanism 7 (see FIG. 1) for supporting the inkjet heads 5.

The pressure pump 24 pressurizes the inside of the ink supply tube 21 to deliver the ink to the inkjet head 5 through the ink supply tube 21. Thus, the ink supply tube 21 is provided with positive pressure with respect to the ink jet head 5.

The suction pump 25 depressurizes the inside of the ink discharge tube 22 to suction the ink from the inkjet head 5 through the ink discharge tube 22. Thus, the ink discharge tube 22 is provided with negative pressure with respect to the ink jet head 5. It is arranged that the ink can circulate between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. Specifically, the scanning mechanism 7 is provided with a pair of guide rails 31, 32, a carriage 33, and a drive mechanism 34, wherein the pair of guide rails 31, 32 extend in the Y direction, the carriage 33 is movably supported by the pair of guide rails 31, 32, and the drive mechanism 34 moves the carriage 33 in the Y direction. It should be noted that the conveying mechanisms 2, 3 and the scanning mechanism 7 function as a moving mechanism for moving the liquid jet heads 5 and the recording target medium P relatively to each other.

The drive mechanism 34 is disposed between the guide rails 31, 32 in the X direction. The drive mechanism 34 is provided with a pair of pulleys 35, 36, an endless belt 37, and a drive motor 38, wherein the pair of pulleys 35, 36 are disposed at a distance in the Y direction, the endless belt 37 is wound between the pair of pulleys 35, 36, and the drive motor 38 rotationally drives the pulley 35 as one of the pulleys 35, 36.

The carriage 33 is coupled to the endless belt 37. On the carriage 33, there is mounted the plurality of inkjet heads 5 arranged side by side in the Y direction. In the embodiment, the plurality of inkjet heads 5 consist of inkjet heads 5Y, 5M, 5C, and 5K respectively jetting the ink of the four colors of yellow, magenta, cyan, and black.

[Inkjet Heads]

Figure 3:
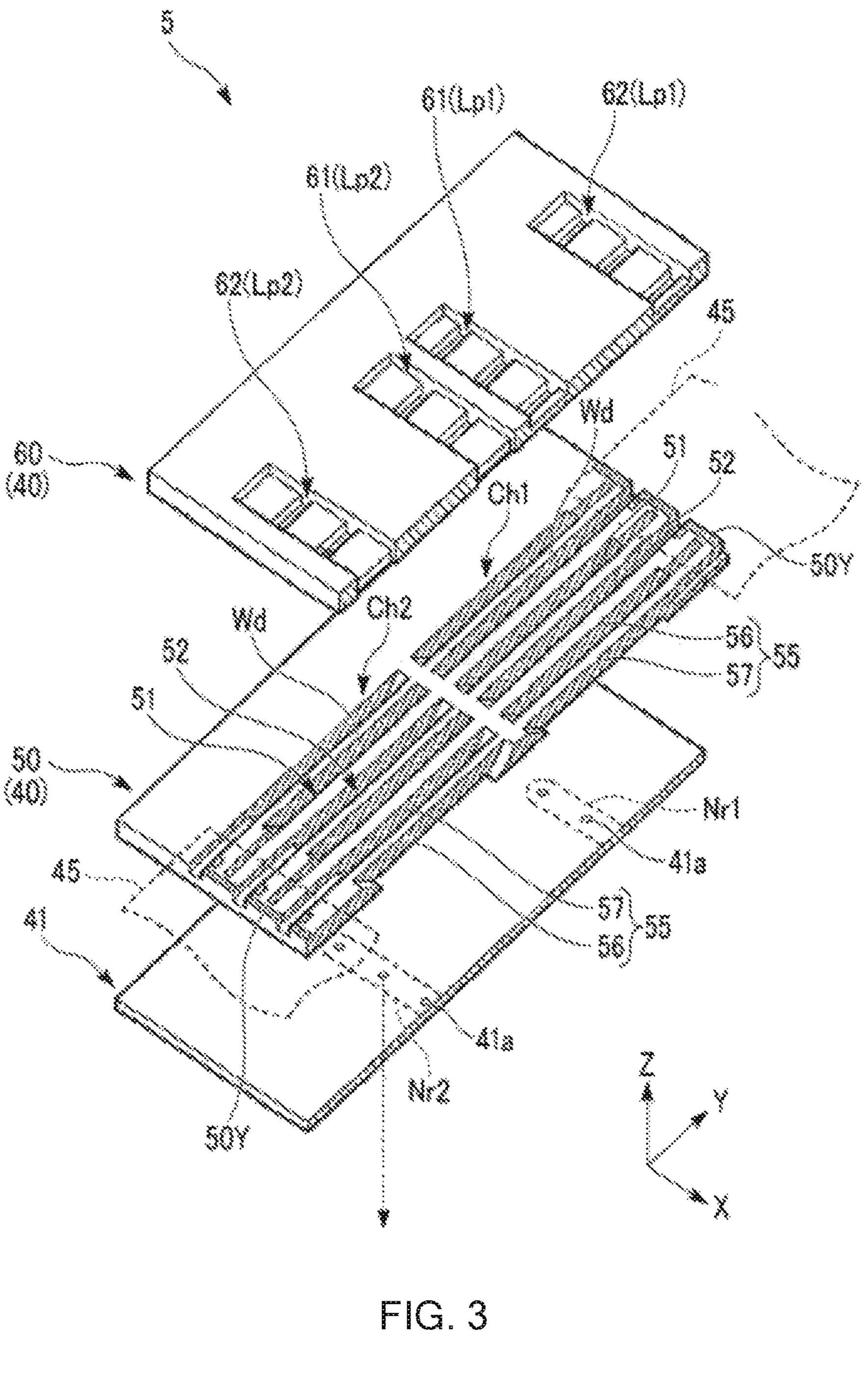
FIG. 3 is an exploded perspective view of an actuator plate, a cover plate, and a nozzle plate according to the embodiment.
Figure 4:
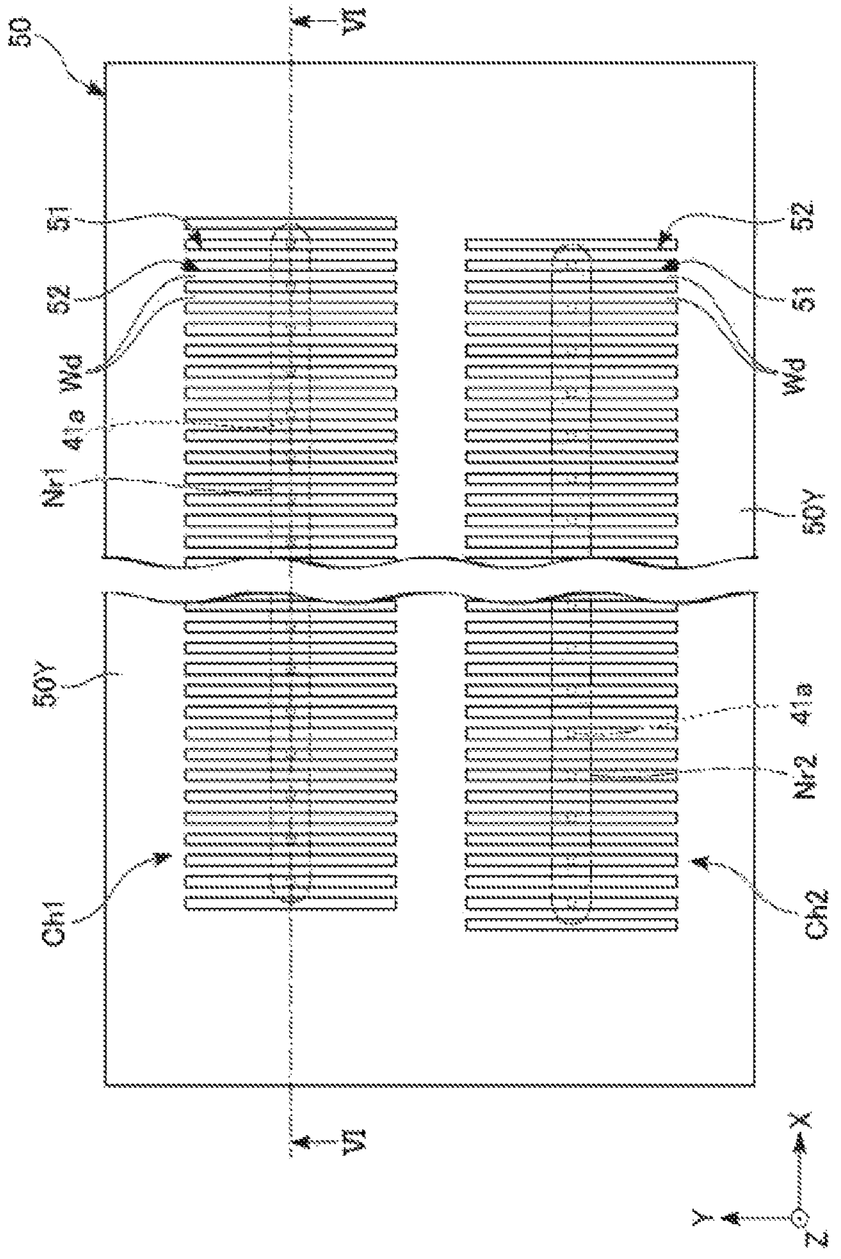
FIG. 4 is a top view of the actuator plate according to the embodiment.
Figure 5:
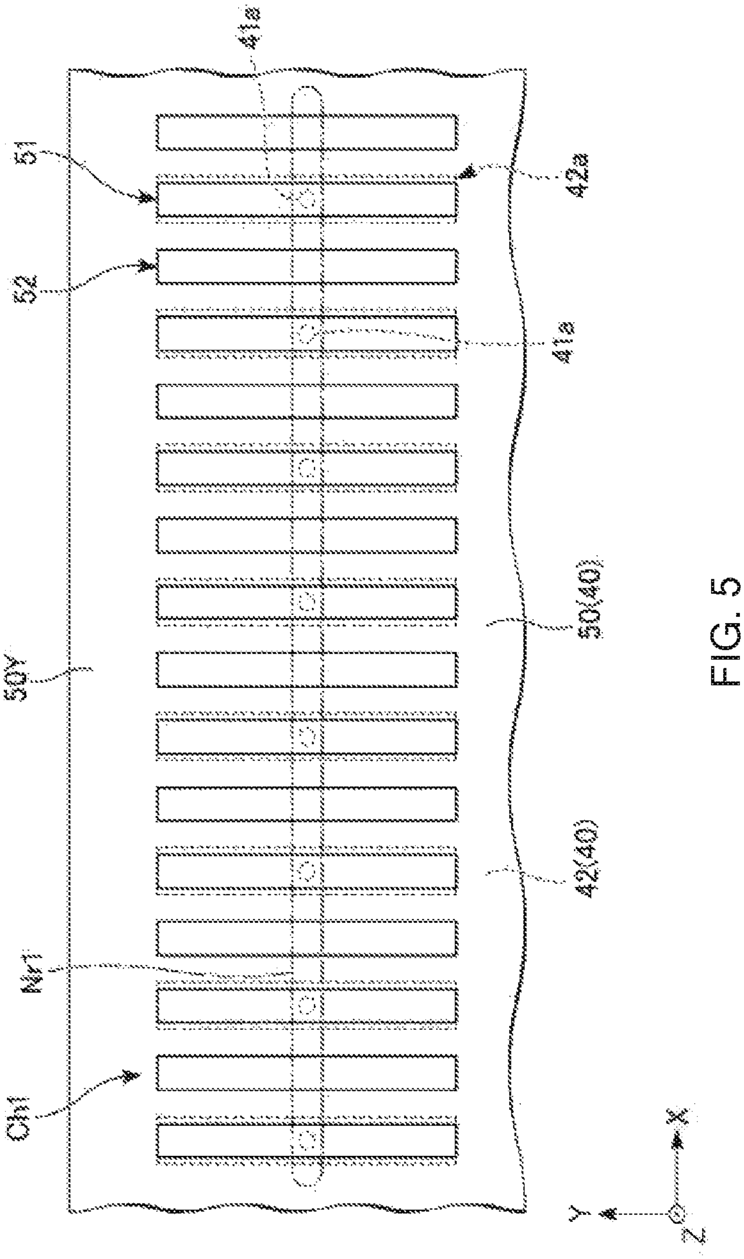
FIG. 5 is a top view of the actuator plate and an intermediate plate according to the embodiment.
Figure 6:
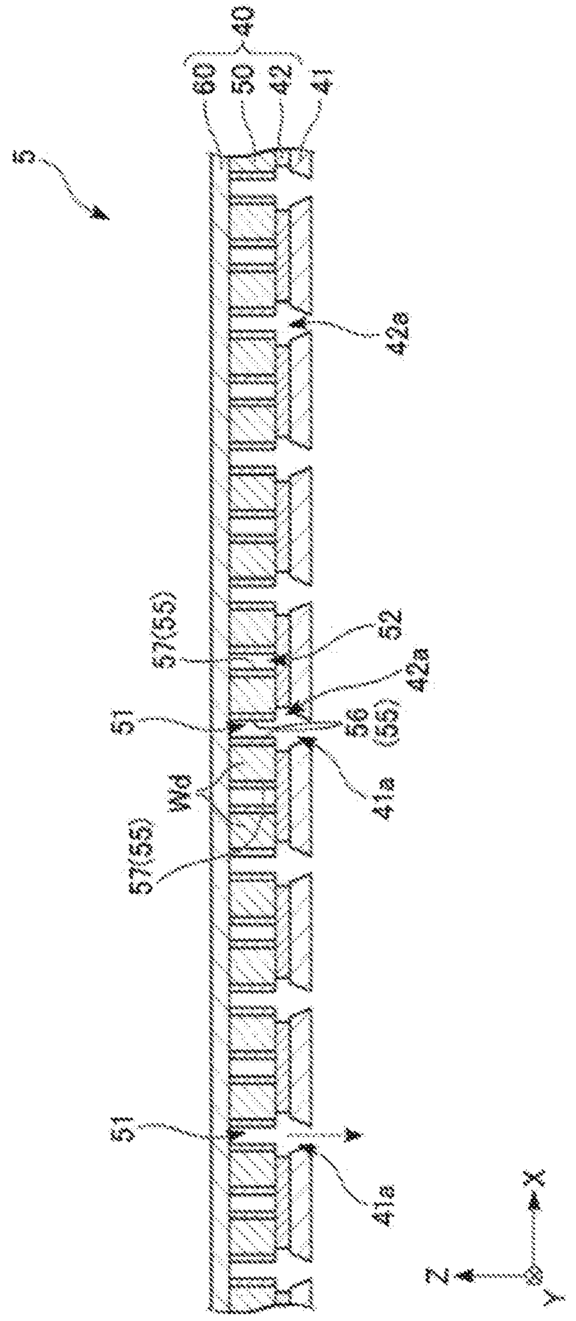
FIG. 6 is a cross-sectional view along the line VI-VI shown in FIG. 4.

FIG. 3 is an exploded perspective view of an actuator plate 50, a cover plate 60, and a nozzle plate 41. FIG. 4 is a top view of the actuator plate 50. FIG. 5 is a top view of the actuator plate 50 and an intermediate plate 42. FIG. 6 is a cross-sectional view along the line VI-VI shown in FIG. 4. It should be noted that the illustration of the intermediate plate 42 is omitted in FIG. 3. In FIG. 4, nozzle arrays Nr1, Nr2 (a first nozzle array Nr1 and a second nozzle array Nr2) are represented by dotted lines. In FIG. 5, the first nozzle array Nr1 is represented by the dotted lines.

As shown in FIG. 3, the inkjet heads 5 are each provided with a head chip 40 and the nozzle plate 41. The inkjet heads 5 are each a so-called side-shoot type inkjet head in which the ink passes in the thickness direction of the actuator plate 50, namely the depth direction of jet channels 51.

[Head Chip]

The head chip 40 is provided with the actuator plate 50 and the cover plate 60. Although not shown in the drawings, the necessary part on the surface (including a surface of the inside) of the head chip 40 is provided with a protective film such as a poly-paraxylene film.

[Actuator Plate]

An outer shape of the actuator plate 50 forms a rectangular plate-like shape having long sides in the X direction and short sides in the Y direction. A lower surface (a −Z side surface) of the actuator plate 50 is a surface on which the nozzle plate 41 is disposed via the intermediate plate 42 (see FIG. 6).

The actuator plate 50 includes, for example, any one type or two or more types of piezoelectric materials. The type of the piezoelectric material is not particularly limited, but is, for example, lead zirconate titanate (PZT). The actuator plate 50 of the embodiment is formed of a so-called chevron type laminated substrate having two piezoelectric substrates which are different in polarization direction in the thickness direction (the Z direction), and are stacked on one another.

The actuator plate 50 has a plurality of (e.g., two in the present embodiment) channel rows Ch1, Ch2 arranged at a predetermined distance in the Y direction. One of the two channel rows Ch1, Ch2 is hereinafter referred to as a first channel row Ch1, and the other thereof is hereinafter referred to as a second channel row Ch2. It should be noted that when there is no particular necessity of distinguishing the channel rows Ch1, Ch2 from each other, the description will be presented referring the two channel rows Ch1, Ch2 as channel rows.

As shown in FIG. 4, the channel rows extend in the Y direction. The channel rows each include a plurality of channels 51, 52 each extending in the Y direction and at the same time arranged at intervals in the X direction. Each of the channels 51, 52 is partitioned by drive walls Wd each including a piezoelectric body. The plurality of channels 51, 52 include jet channels 51 for jetting the ink, and non-jet channels 52 which do not jet the ink. The jet channels 51 and the non-jet channels 52 are alternately arranged in the X direction.

The jet channels 51 and the non jet channels 52 in the first channel row Ch1 and the jet channels 51 and the non-jet channels 52 in the second channel row Ch2 are arranged in a staggered manner in the X direction. In other words, the jet channels 51 in the channel rows Ch1, Ch2 are arranged in a zigzag manner, and the non-jet channels 52 in the channel rows Ch1, Ch2 are also arranged in a zigzag manner.

Figure 7:
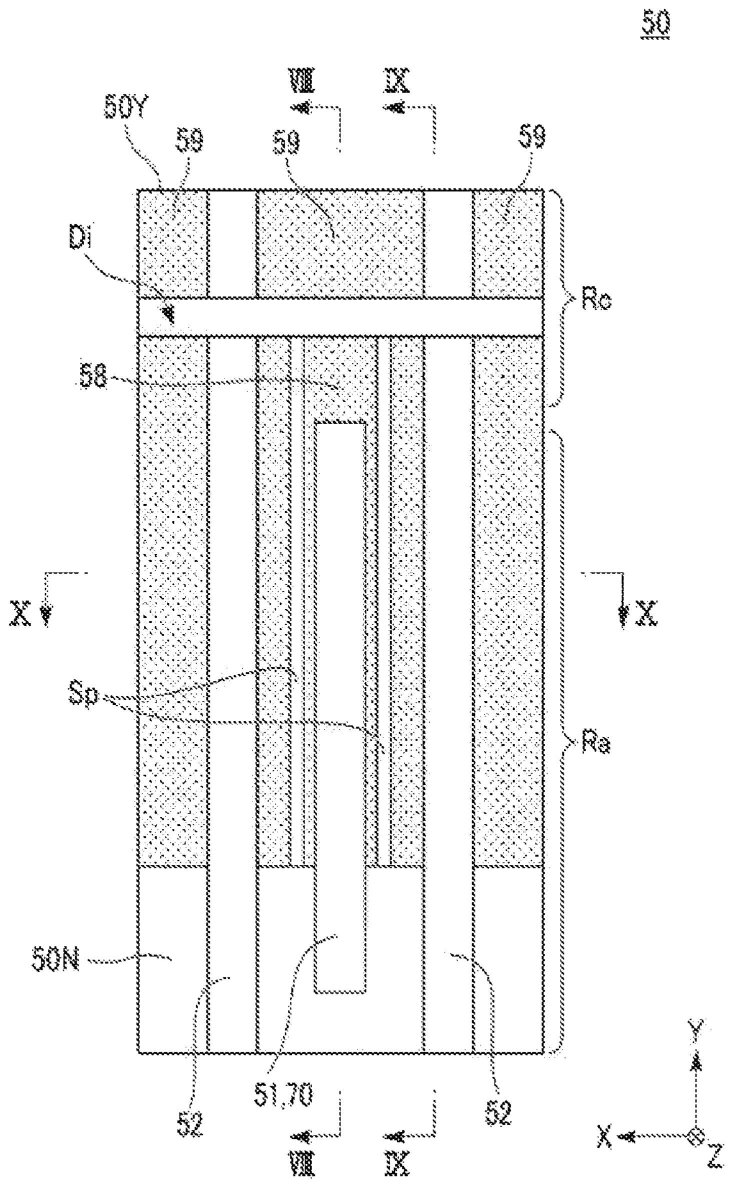
FIG. 7 is a bottom view of the actuator plate according to the embodiment.
Figure 8:
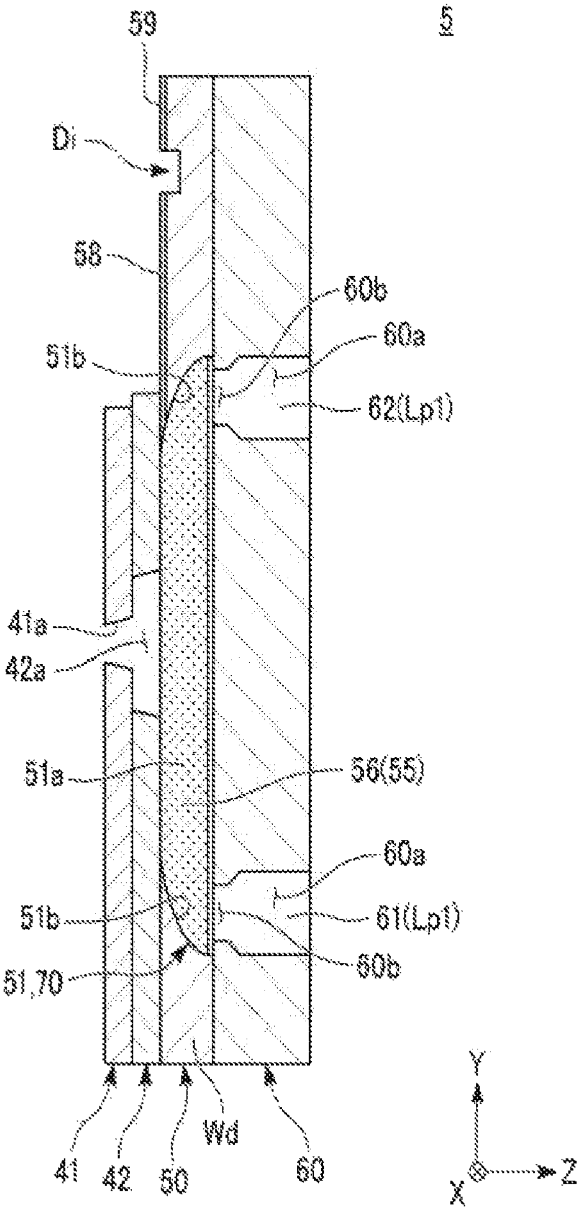
FIG. 8 is a cross-sectional view of the inkjet head along the line VIII-VIII shown in FIG. 7.
Figure 9:
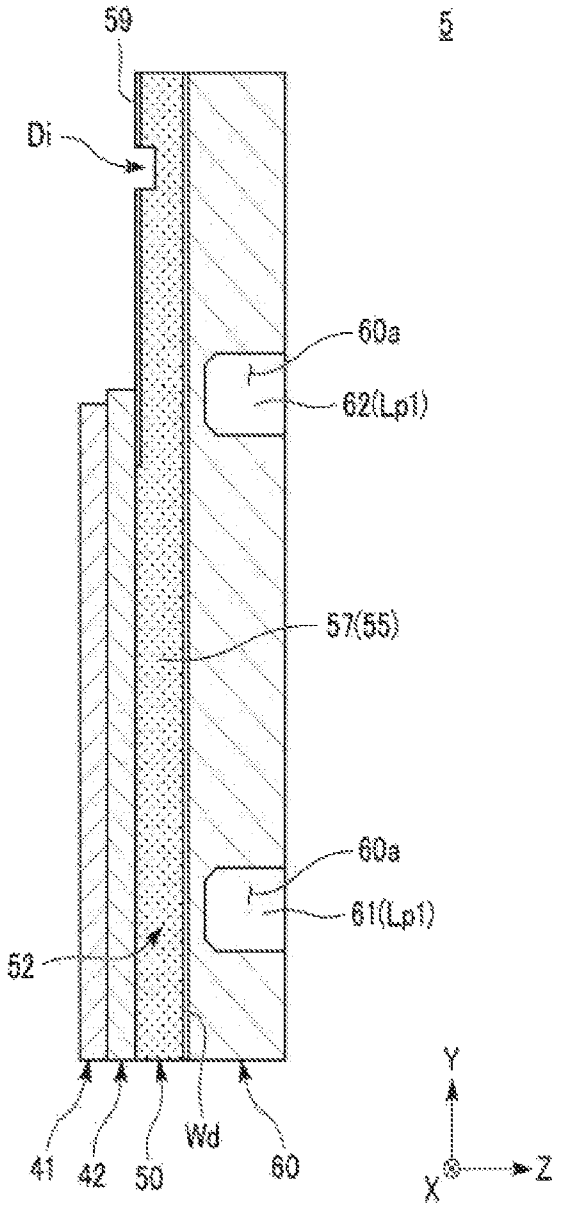
FIG. 9 is a cross-sectional view of the inkjet head along the line IX-IX shown in FIG. 7.
Figure 10:
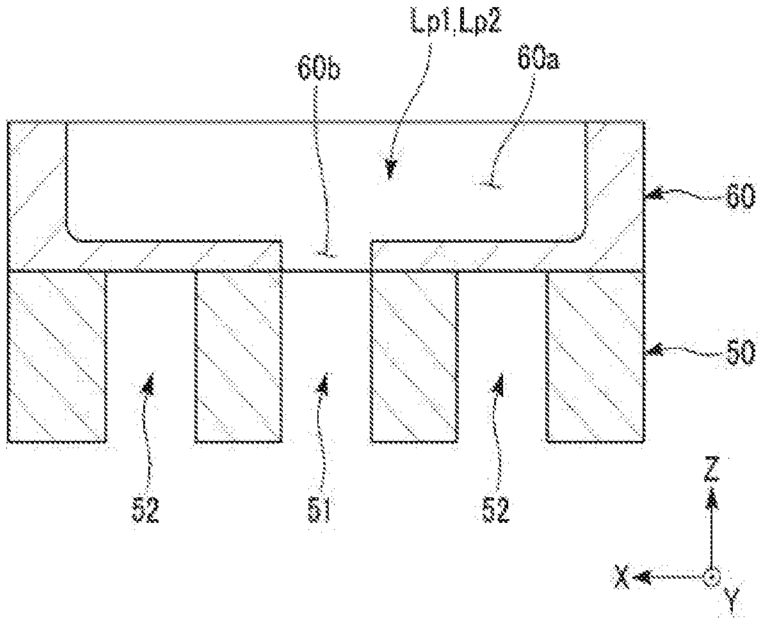
FIG. 10 is a cross-sectional view of the actuator plate and the cover plate along the line X-X shown in FIG. 7.

FIG. 7 is a bottom view of the actuator plate 50. FIG. 8 is a cross-sectional view of the inkjet head 5 along the line VIII-VIII shown in FIG. 7. FIG. 9 is a cross-sectional view of the inkjet head 5 along the line IX-IX shown in FIG. 7. FIG. 10 is a cross-sectional view of the actuator plate 50 and the cover plate 60 along the line X-X shown in FIG. 7.

As shown in FIG. 7, a lower surface of the actuator plate 50 has nozzle peripheral areas Ra on the periphery of the nozzle holes 41*a* (see FIG. 8), and coupling areas Rc to which external boards 45 (see FIG. 3) are coupled.

The nozzle peripheral areas Ra are each an area opposed to the nozzle plate 41 (see FIG. 8) out of the lower surface of the actuator plate 50. The coupling areas Rc are each an area which is not opposed to the nozzle plate 41 out of the lower surface of the actuator plate 50. The coupling areas Rc are each disposed at an outer side of the nozzle peripheral area Ra in the Y direction. The coupling areas Rc are each disposed in an end portion (hereinafter also referred to as a tail portion 50Y) in the Y direction of the actuator plate 50. It should be noted that the protective film is not provided to the coupling area Rc.

The jet channels 51 are disposed in the nozzle peripheral area Ra. The jet channels 51 are not disposed in the coupling area Rc. The jet channels 51 each have a rectangular shape extending in the Y direction when viewed from the Z direction. For example, the protective film 70 is provided to an inner surface of each of the jet channels 51.

In the cross-sectional view shown in FIG. 8, the jet channel 51 has an extending portion 51*a* extending in the Y direction, and uprise portions 51*b* connecting to the extending portion 51*a* in the Y direction. The extending portion 51*a* has a uniform groove depth over the length in the Y direction. The uprise portions 51*b* each have a groove depth gradually decreasing in a direction from each of both ends of the extending portion 51*a* outward in the Y direction.

As shown in FIG. 7, the non jet channels 52 are each disposed so as to straddle the nozzle peripheral area Ra and the coupling area Rc. The non-jet channel 52 extends over the length in the Y direction of the actuator plate 50. In the cross-sectional view shown in FIG. 9, the non-jet channel 52 has a uniform groove depth over the length in the Y direction. It should be noted that the protective film 70 (see FIG. 7) is not provided to the non-jet channels 52.

As shown in FIG. 6, the side surface of each of the drive walls Wd is provided with a drive electrode 55 extending in the Y direction. The drive electrodes 55 are electrodes for electrically driving (deforming) the drive walls Wd in order to make the plurality of jet channels 51 function as the pressure chambers. The drive electrodes 55 include a pair of common electrodes 56 disposed on side surfaces (the inner surface of the jet channel 51) of the drive wall Wd partitioning the jet channel 51, and a pair of individual electrodes 57 disposed on the side surfaces (the inner surface of the non-jet channel 52) of the drive wall Wd partitioning the non-jet channel 52.

The pair of common electrodes 56 opposed to each other in the same jet channel 51 are electrically isolated from each other. As shown in FIG. 8, the common electrode 56 is formed in an area from a lower surface (−Z side surface) of the drive wall Wd to the +Z side of a central position in the Z direction of the jet channel 51. The common electrode 56 extends to, for example, a position at the +Z side of a boundary (a joint surface) between two piezoelectric substrates different in polarization direction from each other.

On the lower surface of the actuator plate 50, there is disposed a plurality of common pads 58 electrically coupled to the common electrodes 56. The common pads 58 each electrically couple the pair of common electrodes 56 opposed to each other in the same jet channel 51 to each other. The common pads 58 are each disposed on the periphery of the jet channel 51.

As shown in FIG. 6, the pair of individual electrodes 57 opposed to each other in the same non-jet channel 52 are electrically isolated from each other. As shown in FIG. 9, the individual electrode 57 is formed in an area from the lower surface of the drive wall Wd to the +Z side of a central position in the Z direction of the non jet channel 52. The individual electrode 57 extends to, for example, a position at the +Z side of a boundary (a joint surface) between two piezoelectric substrates different in polarization direction from each other.

On the lower surface of the actuator plate 50, there is disposed a plurality of individual pads 59 electrically coupled to the individual electrodes 57. The individual pads 59 each electrically couple the pair of individual electrodes 57 opposed to each other via the jet channel 51 to each other. As shown in FIG. 7, the individual pad 59 is disposed between the non-jet channels 52 adjacent to each other across the jet channel 51. The individual pad 59 is disposed so as to electrically be isolated from the common pads 58. The individual pad 59 is disposed at the outer side of the common pad 58 in the Y direction. The individual pad 59 is disposed so as to straddle the non-jet channels 52 adjacent to each other in the X direction.

On the lower surface of the actuator plate 50, there are disposed electrode separation parts Sp for electrically isolating the common pad 58 and the individual pads 59 from each other. The electrode separation part Sp extends linearly along the Y direction. One end in the Y direction of the electrode separation part Sp is connected to a groove part Di. The other end in the Y direction of the electrode separation part Sp is connected to a portion (an electrode nonformation part 50N) where no electrode is formed on the lower surface of the actuator plate 50.

As shown in FIG. 3, in the tail portion 50Y, there is mounted the external board 45 for electrically coupling the drive electrodes 55 and the inkjet head 5 to each other. For example, the external board 45 is a flexible printed board having flexibility. It should be noted that in FIG. 3, a part of outer edge (outline) of each of the external boards 45 is represented by the dotted line. Wiring patterns provided to the external board 45 are electrically coupled to the common pads 58 and the individual pads 59 described above (see FIG. 7), respectively. Thus, the drive voltage is applied to each of the drive electrodes 55 from the inkjet head 5 via the external board 45.

As shown in FIG. 7, the groove part Di extending along the X direction is disposed between the common pad 58 and the individual pad 59 in the lower surface of the actuator plate 50. The width in the Y direction of the groove part Di is larger than the width in the Y direction of a coupling interconnection not shown provided to the external board 45. Thus, by disposing the coupling interconnection of the external board 45 at a position corresponding to the groove part Di of the actuator plate 50 when coupling the external board 45 to the actuator plate 50, it is possible to prevent the coupling interconnection of the external board 45 and the individual pad 59 of the actuator plate 50 from making contact with each other. Therefore, it is possible to prevent electrical short circuit between the coupling interconnection of the external board 45, and the individual pad 59 of the actuator plate 50 and further the individual electrode 57 coupled to the individual pad 59.

It should be noted that as shown in FIG. 9, it is preferable for the length (the depth) in the Z direction of the groove part Di to be shorter than the length in the Z direction of each of the electrodes disposed on the side surface of the drive wall Wd. Thus, it is possible to form the groove part Di without dividing each of the electrodes on the side surface of the drive wall Wd.

[Cover Plate]

As shown in FIG. 3, an outer shape of the cover plate 60 forms a rectangular plate-like shape having long sides in the X direction and short sides in the Y direction. For example, the lengths of the long side and the short side of the cover plate 60 are substantially the same as the lengths of the long side and the short side of the actuator plate 50.

The cover plate 60 is a plate for introducing the ink into the actuator plate 50 (the plurality of jet channels 51), and at the same time discharging the ink from the actuator plate 50. As shown in FIG. 6, the actuator plate 50 is disposed between the intermediate plate 42 and the cover plate 60. The lower surface of the cover plate 60 is bonded to the upper surface of the actuator plate 50.

As shown in FIG. 3, the cover plate 60 has ink flow channels Lp1, Lp2 (liquid flow channels) communicated with the jet channels 51. It should be noted that the ink flow channels Lp1, Lp2 are not communicated with the non jet channels 52 (see FIG. 9). The ink flow channels Lp1, Lp2 are disposed in two sets, namely first flow channels Lp1 corresponding to the jet channels 51 in the first channel row Ch1, and second flow channels Lp2 corresponding to the jet channels 51 in the second channel row Ch2.

The ink flow channels Lp1, Lp2 extend in the X direction. It should be noted that when there is no particular necessity of distinguishing the two sets of flow channels from each other, the description will be presented referring the two sets of flow channels as ink flow channels. As shown in FIG. 10, the ink flow channels each have a manifold 60*a* opening the cover plate 60 toward the +Z side, and slits 60*b* which are communicated with the manifold 60*a* and opens toward the −Z side. The manifold 60*a* is communicated with the jet channels 51 through the slits 60*b*. It should be noted that the manifold 60*a* is not communicated with the non-jet channels 52.

As shown in FIG. 3, the ink flow channels include ink supply channels 61 for supplying the jet channels 51 with the ink, and ink discharge channels 62 for discharging the ink from the jet channels 51. The ink supply channel 61 in the first flow channels Lp1 and the ink supply channel 61 in the second flow channels Lp2 can be disposed at positions adjacent to each other in the Y direction.

As shown in FIG. 8, the ink supply channels 61 are each communicated with one end in the Y direction of each of the jet channels 51. The ink supply channels 61 each extend in the X direction so as to straddle the one ends in the Y direction of the respective jet channels 51. The ink is supplied to each of the jet channels 51 via the ink supply channel 61.

The ink discharge channels 62 are each communicated with the other ends in the Y direction of the jet channels 51. The ink discharge channels 62 each extend in the X direction so as to straddle the other ends in the Y direction of the respective jet channels 51. The ink is discharged from each of the jet channels 51 via the ink discharge channel 62.

It should be noted that it is preferable for the cover plate 60 to be formed of a material having an insulating property, and having thermal conductivity equal to or higher than the thermal conductivity of a formation material of the actuator plate 50. For example, when forming the actuator plate 50 with PZT, it is preferable for the cover plate 60 to be formed of PZT or silicon. Thus, it is possible to relax the temperature variation in the actuator plate 50 to achieve homogenization of the ink temperature. Thus, it is possible to achieve the homogenization of the jetting speed of the ink to improve printing stability.

[Nozzle Plate]

As shown in FIG. 3, an outer shape of the cover plate 41 forms a rectangular plate-like shape having long sides in the X direction and short sides in the Y direction. As shown in FIG. 6, the nozzle plate 41 is disposed so as to be opposed to the actuator plate 50 via the intermediate plate 42. As shown in FIG. 4, the nozzle plate 41 has a plurality of (e.g., two in the present embodiment) nozzle arrays Nr1, Nr2 arranged at a predetermined distance in the Y direction. The inkjet head 5 is a so-called two-line type inkjet head. The two nozzle arrays Nr1, Nr2 are a first nozzle array Nr1 corresponding to the first channel row Ch1, and a second nozzle array Nr2 corresponding to the second channel row Ch2. It should be noted that when there is no particular necessity of distinguishing the two nozzle arrays from each other, the description will be presented referring the two nozzle arrays as nozzle arrays.

The nozzle arrays extend in the X direction. The nozzle arrays each has a plurality of nozzle holes 41*a* arranged at predetermined intervals in the X direction. The nozzle holes 41*a* are each a jet orifice of the ink. The nozzle holes 41*a* penetrate the nozzle plate 41 in the Z direction. The opening shape (the shape of the nozzle hole 41*a* viewed from the Z direction) of the nozzle hole 41*a* is, for example, a circular shape.

As shown in FIG. 6, the direction (the jet direction of the ink) in which the ink is jetted from the nozzle hole 41*a* is the −Z side. In other words, the jet direction of the ink is a direction from the actuator plate 50 toward the nozzle plate 41. The inner diameter of each of the nozzle holes 41*a* gradually decreases in a direction toward the jet direction of the ink. In other words, the nozzle hole 41*a* is a through orifice having a taper shape decreasing in diameter toward the −Z side.

The nozzle hole 41*a* is communicated with the jet channel 51 via a communication hole 42*a*. Thus, the ink supplied from the jet channels 51 is jetted from the respective nozzle holes 41*a*.

In contrast, the nozzle hole 41*a* is not communicated with the non-jet channels 52. The non jet channels 52 are covered with the nozzle plate 41 from below.

As shown in FIG. 5, the nozzle holes 41*a* are each disposed at a position corresponding to a substantially central area in the Y direction of the jet channel 51. The pitch (the distance between the two nozzle holes 41*a* adjacent to each other) of the plurality of nozzle holes 41*a* in the X direction is substantially the same as the pitch (the distance between the two jet channels 51 adjacent to each other) of the plurality of jet channels 51 in the X direction. As shown in FIG. 4, the nozzle holes 41*a* in the first nozzle array Nr1 and the nozzle holes 41*a* in the second nozzle array Nr2 are arranged in a staggered manner in the X direction. In other words, the nozzle holes 41*a* in the nozzle arrays Nr1, Nr2 are arranged in a zigzag manner in the X direction.

It should be noted that the nozzle plate 41 can be formed of an electrically-conductive material. The types of the electrically-conductive material are not particularly limited, but are preferably metal materials such as stainless steel (SUS). Since the metal material has high scratch resistance, by including the metal material in the nozzle plate 41, the physical strength of the nozzle plate 41 is enhanced. It should be noted that the type of SUS is not particularly limited, but there can be cited, for example, SUS316L and SUS304.

[Intermediate Plate]

As shown in FIG. 6, the head chip 40 is further provided with the intermediate plate 42. An outer shape of the intermediate plate 42 forms a rectangular plate-like shape having long sides in the X direction and short sides in the Y direction. For example, the outer shape of the intermediate plate 42 is substantially the same as the outer shape of the nozzle plate 41. The intermediate plate 42 is disposed between the nozzle plate 41 and the actuator plate 50. The intermediate plate 42 is a plate for aligning the nozzle plate 41 and the actuator plate 50 with each other.

The intermediate plate 42 has a plurality of communication holes 42*a* at positions corresponding to the jet channels 51 and the nozzle holes 41*a*, respectively. The communication holes 42*a* are arranged in substantially the same manner as the jet channels 51. As shown in FIG. 5, the communication holes 42*a* each extend in the Y direction, and at the same time, are arranged at predetermined intervals in the X direction. It should be noted that the communication hole 42*a* is not disposed at positions overlapping the respective non-jet channels 52 when viewed from the Z direction.

The width in the X direction of the communication hole 42*a* is preferably larger than the width in the X direction of the jet channel 51. Thus, it becomes difficult for the actuator plate 50 to hinder the flow of the ink supplied from the jet channels 51 to the respective nozzle holes 41*a*. Therefore, it becomes difficult for the problems related to the jet characteristics of the ink such as deviation in jet direction of the ink to occur. It should be noted that it is more preferable for the jet channels 51 to be arranged within an area defined by the width of the communication hole 42*a* when viewed from the Z direction.

Figure 11:
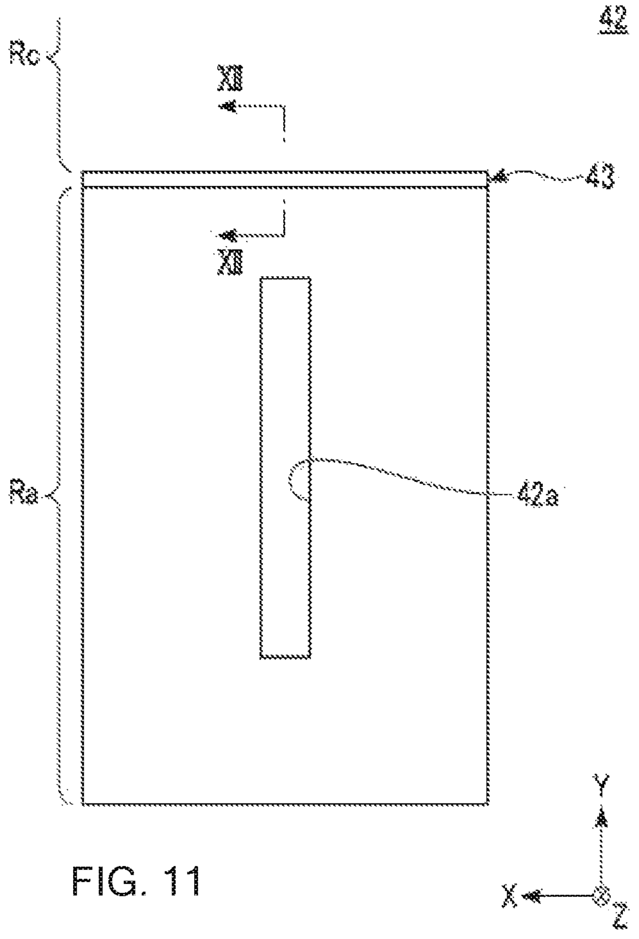
FIG. 11 is a bottom view of the intermediate plate according to the embodiment.
Figure 12:
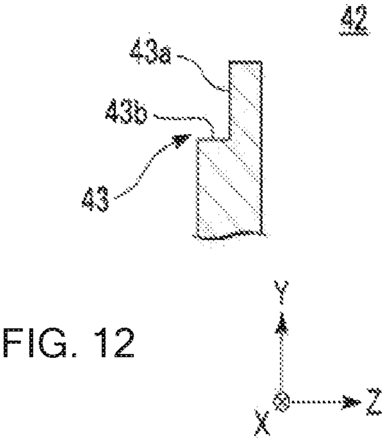
FIG. 12 is a cross-sectional view along the line XII-XII shown in FIG. 11.

As shown in FIG. 11, the intermediate plate 42 has a step part 43 in a region which separates the nozzle peripheral area Ra and the coupling area Rc from each other. In the cross-sectional view shown in FIG. 12, the step part 43 is formed to have an L shape. The step part 43 has a first wall surface 43*a* parallel to the X-Y plane, and a second wall surface 43*b* parallel to the X-Z plane. The first wall surface 43*a* is disposed between an upper surface and a lower surface of the intermediate plate 42. The second wall surface 43*b* is disposed between a −Y side end of the first wall surface 43*a* and a +Y side end of the lower surface of the intermediate plate 42.

It is preferable for the intermediate plate 42 to be formed of the insulating material. The types of the insulating material are not particularly limited, but there can be cited, for example, glass, polyimide, polypropylene, and polyethylene terephthalate. For example, when forming the base member of the intermediate plate 42 from the material described above, it is possible to adopt a structure in which the periphery of the base member is covered with poly-paraxylene or the like.

Further, as the material of the intermediate plate 42, there can be cited alumina or the like. It should be noted that the intermediate plate 42 can be formed of a piezoelectric material such as PZT similarly to the actuator plate 50 besides the material described above.

As shown in FIG. 6, the nozzle plate 41 and the actuator plate 50 are bonded to each other via the intermediate plate 42. Thus, the nozzle plate 41 having conductivity and the actuator plate 50 having conductivity are electrically separated (isolated) from each other via the intermediate plate 42 having an insulation property. When the nozzle plate 41 and the actuator plate 50 are insulated from each other via the intermediate plate 42, it becomes possible to use an electrically-conductive material as the formation material of the nozzle plate 41, and at the same time, it becomes possible to use a piezoelectric material as the formation material of the actuator plate 50. Therefore, it becomes possible to use a metal material or the like having high scratch resistance as the formation material of the nozzle plate 41. Thus, it becomes difficult for the nozzle plate 41 to be damaged (e.g., worn) while preventing the short circuit between the nozzle plate 41 and the actuator plate 50.

For example, it is preferable for the intermediate plate 42 to have a linear expansion coefficient E1 between the linear expansion coefficient E2 of the nozzle plate 41 and the linear expansion coefficient E3 of the actuator plate 50 ($E2<E1<E3$ or $E3<E1<E2$). When a thermal deformation occurs in each of the nozzle plate 41, the intermediate plate 42, and the actuator plate 50, by satisfying the relationship described above, the displacement between the nozzle plate 41 and the actuator plate 50 caused by a difference in linear expansion coefficient (thermal expansion coefficient) is absorbed by the intermediate plate 42. Therefore, it is possible to prevent the separation between the nozzle plate 41 and the actuator plate 50 due to the thermal deformation compared to when the intermediate plate 42 does not intervene between the nozzle plate 41 and the actuator plate 50. Therefore, it becomes difficult for the failure such as deflection to occur when jetting the ink.

[Operations of Printer]

As shown in FIG. 1, in the printer 1 according to the present embodiment, the recording paper P is conveyed in the X direction, and at the same time, the carriage 33 reciprocates in the Y direction. The inkjet heads 5 on the carriage 33 jet the ink on the recording paper P while reciprocating in the Y direction. Thus, images and so on are recorded on the recording paper P.

[Operations of Inkjet Heads]

In each of the inkjet heads 5 according to the present embodiment, the ink is jetted on the recording paper P using a shear mode in the following procedure.

First, when the carriage 33 reciprocates, the drive voltages are applied to the drive electrodes 55 (the common electrodes 56 and the individual electrodes 57) via the external boards 45. Specifically, the drive voltage is applied to the respective drive electrodes 55 provided to the pair of drive walls Wd defining the jet channel 51. Thus, each of the pair of drive walls Wd deforms so as to protrude toward the non jet channel 52 adjacent to the jet channel 51.

Here, as described above, in the actuator plate 50, the two piezoelectric substrates set so that the respective polarization directions in the Z direction are different from each other are stacked on one another. In addition, the drive electrodes 55 each extend from the lower surface of the drive wall Wd to the area at the +Z side of the central position in the Z direction of the drive wall Wd. In this case, by applying the drive voltage to the drive electrodes 55, the drive wall Wd makes a flexural deformation due to the piezoelectric thickness-shear effect taking a substantially central position of the drive wall Wd in the Z direction as an origination. Thus, each of the jet channels 51 deforms as if it bulges using the flexural deformation of the drive wall Wd described above.

The volume of each of the jet channels 51 increases using the flexural deformations of the pair of drive walls Wd based on the piezoelectric thickness-shear effect. Thus, the ink supplied to each of the ink supply channels 61 is guided to the inside of each of the jet channels 51.

Subsequently, the ink having been guided to the inside of each of the ejection channels 51 propagates inside the ejection channel 51 as a pressure wave. In this case, the drive voltage to be applied to the drive electrodes 55 becomes zero (0 V) at the timing at which the pressure wave has reached the nozzle hole 41*a* provided to the nozzle plate 41. Thus, the drive walls Wd having flexurally deformed is restored to the original state, and therefore, the volume of each of the jet channels 51 is restored.

Lastly, when the value of each of the jet channels 51 is restored, the pressure increases inside the jet channel 51, and therefore, the ink guided to the inside of the jet channel 51 is pressurized. Thus, the ink shaped like a droplet is jetted from each of the nozzle holes 41*a* toward the outside (the recording paper P).

In this case, for example, since the inner diameter of the nozzle hole 41*a* gradually decreases toward the jet direction of the ink as described above, the jet speed of the ink increases, and at the same time, the straightness of the ink is improved. Thus, the quality of the image and so on to be recorded on the recording paper P is improved.

[Method of Manufacturing Inkjet Heads]

Figure 13:
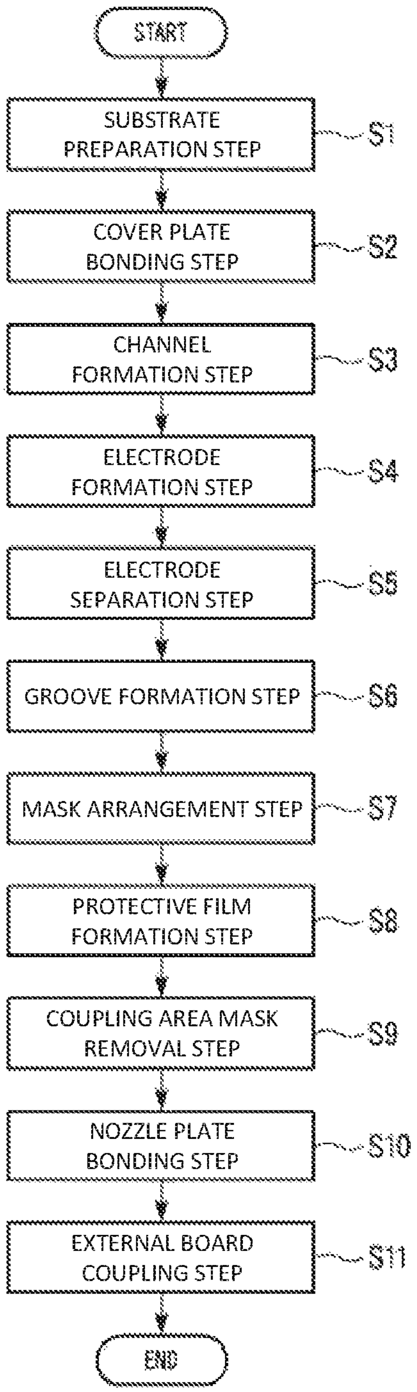
FIG. 13 is a flowchart of a method of manufacturing the inkjet head according to the embodiment.

FIG. 13 is a flowchart of a method of manufacturing the inkjet heads.

As shown in FIG. 13, the method of manufacturing the inkjet heads 5 according to the present embodiment includes a substrate preparation step, a cover plate bonding step, a channel formation step, an electrode formation step, an electrode separation step, a groove formation step, a mask arrangement step, a protective film formation step, a coupling area mask removal step, a nozzle plate bonding step, and an external board coupling step.

In the substrate preparation step (the step S1 in FIG. 13), a wafer or the like for obtaining the constituents of the inkjet heads 5 is prepared in advance. The substrate (e.g., a wafer) for obtaining the actuator plate 50 is hereinafter referred to as an actuator plate substrate AW. In the substrate preparation step, grooves including a plurality of channels are provided to the actuator plate substrate AW. In the substrate preparation step, the cover plate 60 (see FIG. 3) having the ink flow channels is prepared. In the substrate preparation step, the step part 43 is formed in the region which separates the nozzle peripheral area Ra and the coupling area Rc from each other in the intermediate plate 42 (see FIG. 11). After the substrate preparation step, the transition to the cover plate bonding step (the step S2 in FIG. 13) is made.

In the cover plate bonding step, the cover plate 60 is bonded to an upper surface of the actuator plate substrate AW. Thus, a bonded wafer having the actuator plate substrate AW and the cover plate 60 bonded to each other is obtained. After the cover plate bonding step, the transition to the channel formation step (the step S3 in FIG. 13) is made.

In the channel formation step, a lower surface of the actuator plate substrate AW is ground by, for example, a grinder. Thus, the channels 51, 52 (see FIG. 7) are opened on the lower surface of the actuator plate substrate AW. It should be noted that the lower surface (a first surface) of the actuator plate substrate AW is a surface at a side at which the nozzle plate 41 (see FIG. 8) is disposed. After the channel formation step, the transition to the electrode formation step (the step S4 in FIG. 13) is made.

In the electrode formation step, an electrically-conductive film is formed on the inner surface of each of the channels 51, 52 and the lower surface of the actuator plate substrate AW by, for example, an oblique vapor deposition. After the electrode formation step, the transition to the electrode separation step (the step S5 in FIG. 13) is made.

In the electrode separation step, the electrically-conductive film is separated (see FIG. 7) into the common pads 58 and the individual pads 59 on the lower surface of the actuator plate substrate AW using, for example, laser patterning. After the electrode separation step, the transition to the groove formation step (the step S6 in FIG. 13) is made.

In the groove formation step, the groove part Di extending in the X direction is formed (see FIG. 7) by, for example, a dicer. After the groove formation step, the transition to the mask arrangement step (the step S7 in FIG. 13) is made.

Figure 14:
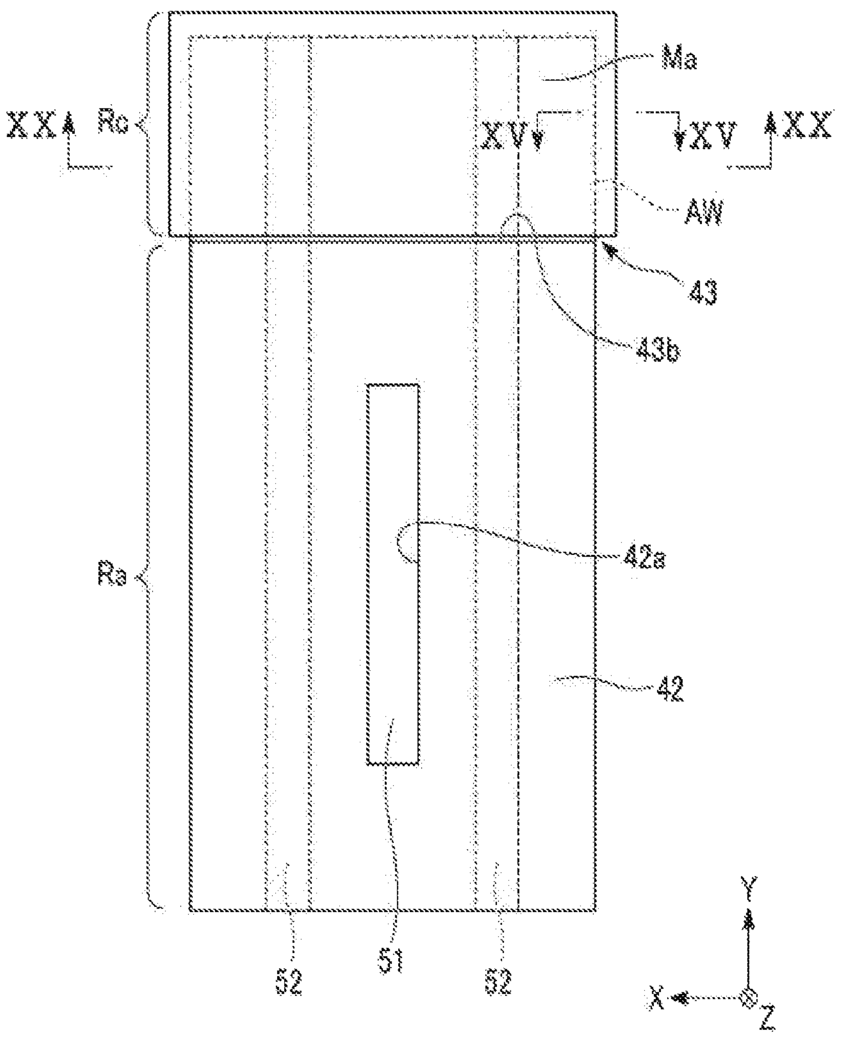
FIG. 14 is an explanatory diagram of a mask arrangement step according to the embodiment.

As shown in FIG. 14, in the mask arrangement step, a mask (the intermediate plate 42 and a coupling area mask Ma) having opening parts (the communication holes 42*a*) for exposing the jet channels 51 is disposed on the lower surface of the actuator plate substrate AW.

Specifically, in the mask arrangement step, first, the intermediate plate 42 is bonded to the nozzle peripheral area Ra on the lower surface of the actuator plate substrate AW. In the mask arrangement step, after bonding the intermediate plate 42 to the nozzle peripheral area Ra, the coupling area mask Ma is disposed in the coupling area Rc on the lower surface of the actuator plate substrate AW. For example, as the coupling area mask Ma, there is used a masking member such as a tape. In the mask arrangement step, the coupling area mask Ma is disposed in the tail portion 50Y (see FIG. 7) on the lower surface of the actuator plate substrate AW. When disposing the coupling area mask Ma, a −Y end edge of the coupling area mask Ma is disposed along the step part 43 (e.g., the second wall surface 43*b*) of the intermediate plate 42.

In the mask arrangement step, the coupling area mask Ma is disposed so as to straddle the lower surface of the actuator plate substrate AW and both side surfaces in the X direction of the actuator plate substrate AW. It should be noted that the side surface (a second surface) in the X direction of the actuator plate substrate AW is a surface perpendicular to (crossing) the lower surface of the actuator plate substrate AW.

Figure 15:
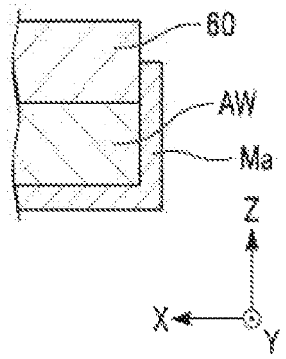
FIG. 15 is a cross-sectional view along the line XV-XV shown in FIG. 14.

For example, as shown in FIG. 15, in the mask arrangement step, the coupling area mask Ma is extended from the X side end of the lower surface of the actuator plate substrate AW to the position at the +Z side of the joint surface between the actuator plate substrate AW and the cover plate 60. It should be noted that in the mask arrangement step, the coupling area mask Ma can be disposed so as to straddle the lower surface of the actuator plate substrate AW and a side surface in the Y direction of the actuator plate substrate AW.

As shown in FIG. 14, due to the mask arrangement step, there is created the state in which the jet channels 51 are exposed from the communication holes 42*a* (opening parts) of the intermediate plate 42, and at the same time, the non-jet channels 52 are covered with the intermediate plate 42 and the coupling area mask Ma. After the mask arrangement step, the transition to the protective film formation step (the step S8 in FIG. 13) is made.

In the protective film formation step, in the state in which the jet channels 51 are exposed, and at the same time, the non-jet channels 52 are covered, the protective film 70 (see FIG. 8) for protecting the common electrodes 56 (see FIG. 8) formed on the inner surfaces of the jet channels 51 from the ink is formed. In the protective film formation step, in the state in which the intermediate plate 42 is disposed in the nozzle peripheral area Ra, and the coupling areas Rc are covered with the coupling area mask Ma, the protective film is provided to the jet channels 51 through the communication holes 42*a* of the intermediate plate 42.

In the protective film formation step, a fluid for providing the protective film to the jet channels 51 is supplied to the jet channels 51 through the communication holes 42*a* of the intermediate plate 42 and the ink flow channels Lp1, Lp2 (see FIG. 10) of the cover plate 60. For example, the protective film is formed by heating paraxylene system dimer to turn to monomer vapor, and reacting the monomer on the inner surfaces of the jet channels 51 as the object. After the protective film formation step, the transition to the coupling area mask removal step (the step S9 in FIG. 13) is made.

In the coupling area mask removal step, the coupling area mask Ma is removed from the lower surface of the actuator plate substrate AW. After the coupling area mask removal step, the transition to the nozzle plate bonding step (the step S10 in FIG. 13) is made.

Figure 16:
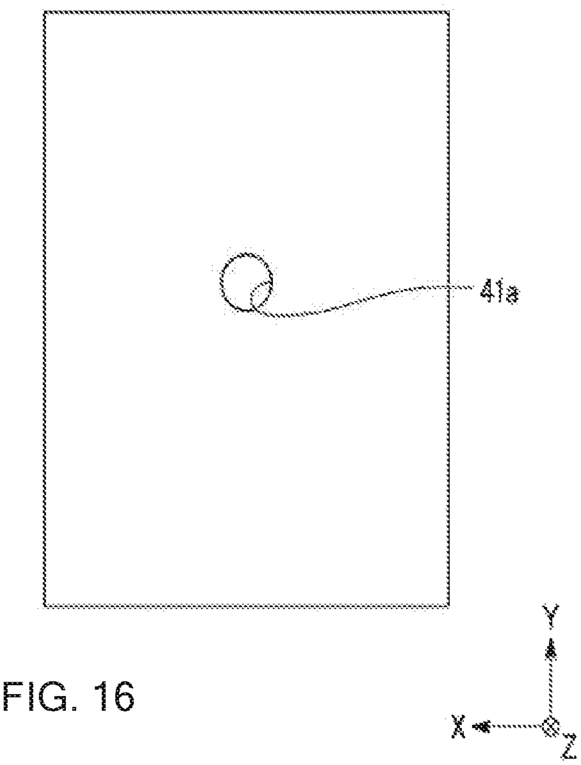
FIG. 16 is a bottom view of the nozzle plate according to the embodiment.

In the nozzle plate bonding step, the nozzle plate 41 is bonded to the lower surface of the intermediate plate 42 (see FIG. 8). When disposing the nozzle plate 41, a +Y end edge of the nozzle plate 41 (see FIG. 16) is disposed along the step part 43 (e.g., the second wall surface 43*b*) of the intermediate plate 42. After the nozzle plate bonding step, the transition to the external board coupling step (the step S11 in FIG. 13) is made.

In the external board coupling step, the external boards 45 (see FIG. 3) are coupled to the respective coupling areas Rc (see FIG. 7) on the lower surface of the actuator plate 50.

Due to the above, the inkjet heads 5 according to the present embodiment are completed (see FIG. 8).

It should be noted that the method of manufacturing the inkjet head is not limited to the example described above, and it is possible to adopt a variety of methods.

For example, the method of manufacturing the inkjet head can be performed in the following order.

First, the channels 51, 52 are provided to the actuator plate substrate AW. Subsequently, the electrodes are formed on the inner surfaces of the respective channels 51, 52. Then, the cover plate substrate is bonded to the actuator plate substrate AW to form the bonded wafer. Then, the bonded wafer is segmentalized (segmentalization into chips). Then, the protective film is provided to a necessary part of the wafer thus segmentalized. Then, the nozzle plate 41 is bonded to the wafer provided with the protective film.

For example, the method of manufacturing the inkjet head can be performed in the following order.

First, the channels 51, 52 are provided to the actuator plate substrate AW. Then, the electrodes are formed on the inner surfaces of the respective channels 51, 52 from the upper surface side of the actuator plate substrate AW. Then, the cover plate substrate is bonded to the actuator plate substrate AW to form the bonded wafer. Then, the lower surface (the lower surface of the actuator plate substrate AW) of the bonded wafer is ground. Thus, the channels 51, 52 are opened on the lower surface of the actuator plate substrate AW. Then, the electrodes are formed on the inner surfaces of the respective channels 51, 52 from the lower surface side of the actuator plate substrate AW. Then, the protective film is provided to the necessary part. Then, the nozzle plate 41 is bonded to the wafer provided with the protective film.

It should be noted that the formation direction of the electrodes to the actuator plate substrate AW can be either of the direction from the upper surface side toward the lower surface side of the actuator plate substrate AW, and the direction from the lower surface side toward the upper surface side of the actuator plate substrate AW.

As described hereinabove, the method of manufacturing the head chip 40 according to the embodiment includes the substrate preparation step of preparing the actuator plate substrate AW having the jet channels 51 respectively communicated with the nozzle holes 41*a* for jetting the ink, and the non jet channels 52 which do not jet the ink, and the protective film formation step of forming the protective film 70 for protecting the common electrodes 56 formed on the inner surfaces of the respective jet channels 51 from the ink in the state in which the jet channels 51 are exposed and the non-jet channels 52 are covered after the substrate preparation step.

According to this method, by providing the protective film 70 to the jet channels 51 exposed in the state in which the non-jet channels 52 are covered, it is possible to prevent the protective film 70 from being provided to the non-jet channels 52. Since the non-jet channels 52 are parts which do not require the protective film 70, it is possible to save the trouble of removing the protective film 70 on the part not requiring the protective film.

Figure 17:
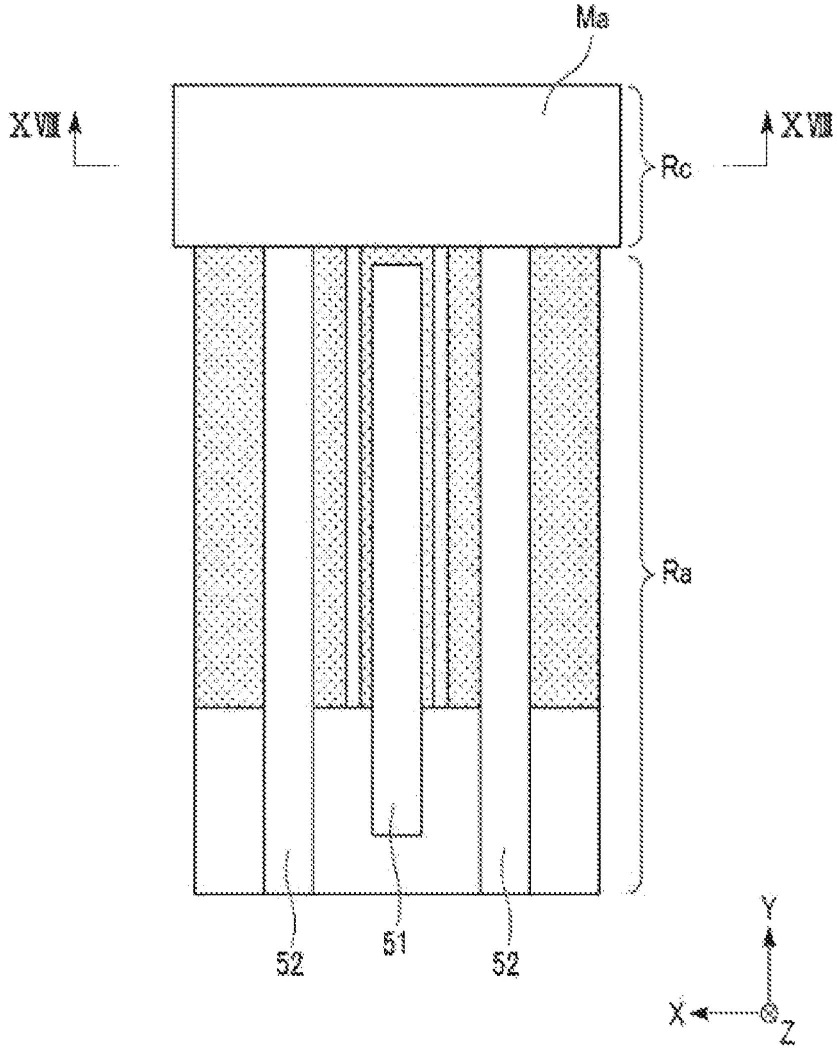
FIG. 17 is an explanatory diagram of a mask arrangement step according to a comparative example.
Figure 18:
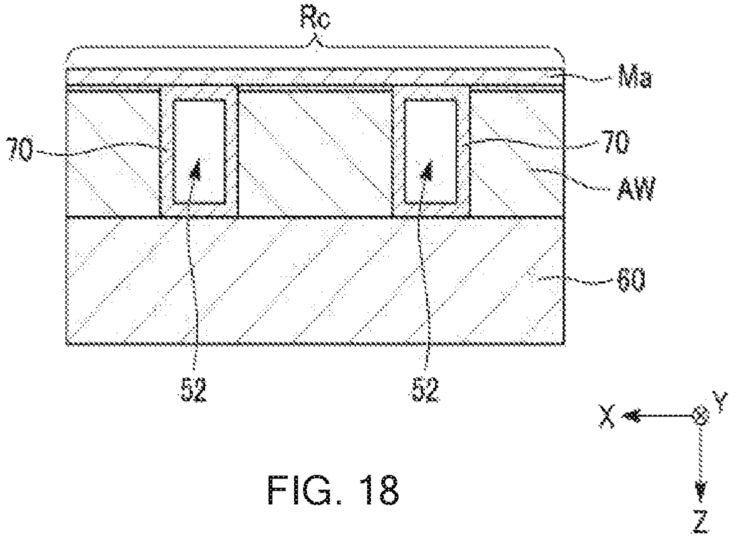
FIG. 18 is a cross-sectional view along the line XVIII-XVIII shown in FIG. 17.
Figure 19:
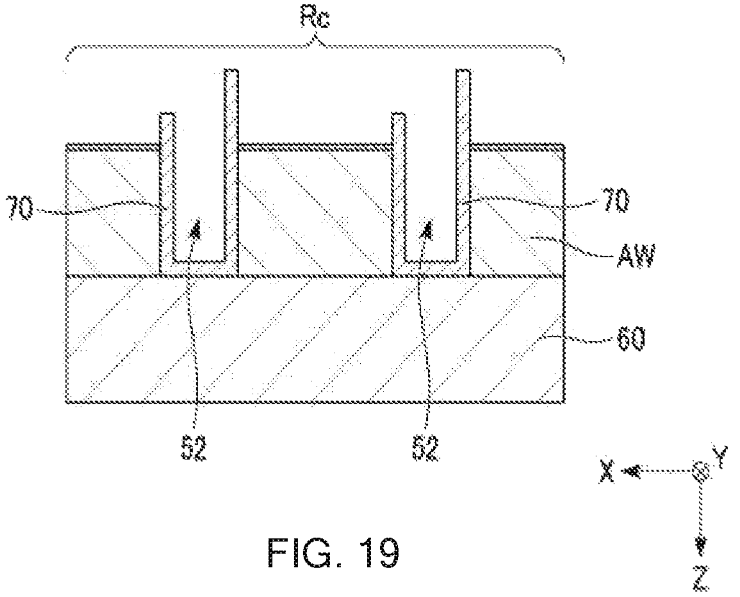
FIG. 19 is a cross-sectional view obtained by removing the mask from FIG. 18.

For example, as an comparative example, there is cited an example in which the protective film 70 (e.g., a poly-paraxylene film) is provided to the jet channels 51 thus exposed in the state in which only the coupling areas Rc are covered with the masking member Ma such as a tape, and the jet channels 51 and the non-jet channels 52 in the nozzle peripheral areas Ra are exposed as shown in FIG. 17. Since the poly-paraxylene film has an advantage of adhering to a complicated structure, the protective film 70 is also provided to the non jet channels 52 in some cases. For example, as a comparative example, there is cited an example in which the protective film 70 is also provided to the non jet channels 52 in the coupling areas Rc as shown in FIG. 18. The protective film 70 is formed so as to straddle the inner surfaces of the non-jet channels 52 in the coupling area Rc and the inner surface of the masking member Ma. For example, in the comparative example, the masking member is removed (e.g., peeled) using a physical method after forming the protective film 70. Then, as shown in FIG. 19, there is a possibility that the protective film 70 is broken to cause fluffing when removing the masking member Ma.

Figure 20:
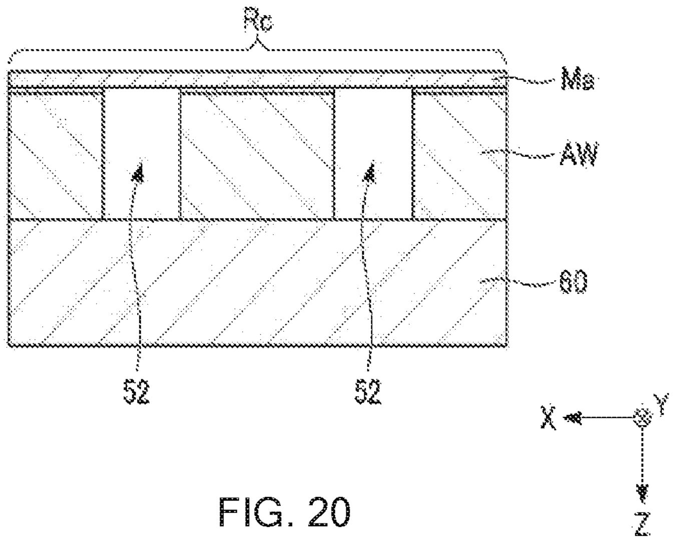
FIG. 20 is a cross-sectional view along the line XX-XX shown in FIG. 14.
Figure 21:
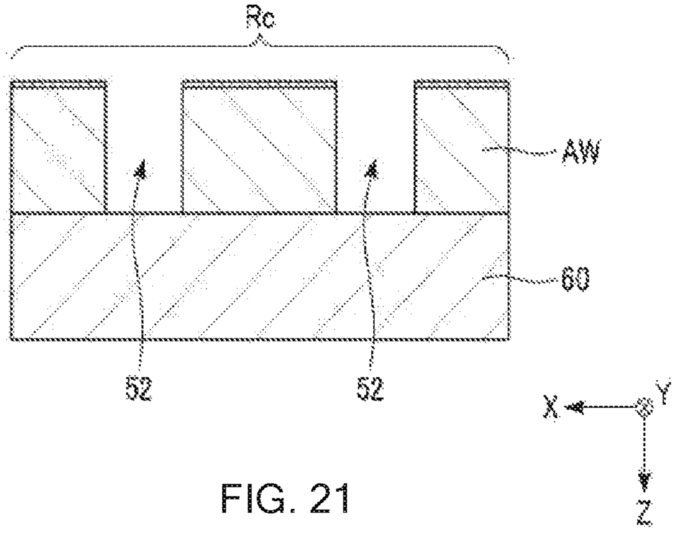
FIG. 21 is a cross-sectional view obtained by removing the mask from FIG. 20.

In contrast, according to the method of manufacturing the head chip 40 related to the embodiment, by providing the protective film 70 to the jet-channels 51 exposed in the state in which the non-jet channels 52 are covered as shown in FIG. 14, it is possible to prevent the protective film 70 from being provided to the non-jet channels 52 in the coupling areas Rc as shown in FIG. 20. Therefore, as shown in FIG. 21, it is possible to prevent the fluffing of the protective film 70 from occurring when removing the masking member Ma.

The actuator plate substrate AW in the embodiment has the lower surface on which the nozzle plate 41 provided with the nozzle holes 41*a* communicated with the respective jet-channels 51 is disposed. In the protective film formation step, the mask (the intermediate plate 42 and the coupling area mask Ma) having the opening parts (the communication holes 42*a*) for exposing the jet channels 51 is disposed on the lower surface of the actuator plate substrate AW, and then the protective film 70 is provided to the jet channels 51 through the communication holes 42*a*.

According to this method, it is possible to prevent the protective film 70 from being provided to the non jet channels 52 with a simple method using the mask (the intermediate plate 42 and the coupling area mask Ma).

The actuator plate substrate AW in the embodiment has the side surfaces crossing the lower surface of the actuator plate substrate AW. In the protective film formation step, the mask (the coupling area mask Ma) is disposed so as to straddle the lower surface and the side surfaces of the actuator plate substrate AW, and then, the protective film 70 is provided to the jet-channels 51 through the communication holes 42*a*.

When the mask is supposedly disposed only on the lower surface of the actuator plate substrate AW, there is a possibility that the protective film 70 is provided to a part not requiring the protective film through a gap between the mask and the lower surface of the actuator plate substrate AW. In contrast, according to the method of manufacturing the head chip 40 related to the embodiment, since the coupling area mask Ma is disposed so as to straddle the lower surface and the side surfaces of the actuator plate substrate AW to thereby cover the gap described above with the coupling area mask Ma, it is possible to prevent the protective film 70 from being provided to the part not requiring the protective film.

In the protective film formation step in the embodiment, the intermediate plate 42 having the communication holes 42*a* communicated with the respective jet channels 51 is bonded, as the mask, to the lower surface of the actuator plate substrate AW, and then the protective film 70 is provided to the jet channels 51 through the communication holes 42*a*.

According to this method, since the intermediate plate 42 is a constituent of the head chip 40, and it is possible to leave the intermediate plate 42 without change after the protective film formation step, it is possible to prevent the protective film 70 from being provided to the non-jet channels 52 with a simpler method.

The lower surface of the actuator plate substrate AW in the embodiment has the nozzle peripheral areas Ra on the periphery of the nozzle holes 41*a*, and the coupling areas Rc to which the external boards 45 are coupled. In the protective film formation step, in the state in which the intermediate plate 42 is disposed in the nozzle peripheral areas Ra, and the coupling areas Rc are covered with the coupling area mask Ma, the protective film 70 is provided to the jet channels 51 through the communication holes 42*a*.

According to this method, since the protective film 70 is prevented from being provided to the coupling areas Rc, it is possible to prevent a coupling failure between the coupling area Rc and the external board 45.

In advance of the protective film formation step in the embodiment, the intermediate plate 42 is provided with the step part 43 in the region which separates the nozzle peripheral area Ra and the coupling area Rc from each other.

According to this method, it is possible to perform the alignment with the coupling area mask Ma using the step part 43. In addition, even when the fluffing of the protective film 70 occurs when removing the coupling area mask Ma, it is possible to prevent the fluffing from reaching the nozzle peripheral area Ra. In addition, when manufacturing the inkjet heads 5, it is possible to perform the alignment with the nozzle plate 41 using the step part 43.

The head chip 40 according to the embodiment is provided with the actuator plate 50 having the jet channels 51 communicated with the respective nozzle holes 41*a* for jetting the ink, and the non-jet channels 52 which do not jet the ink. The actuator plate 50 has the protective film 70 for protecting the common electrodes 56 formed on the inner surfaces of the jet channels 51 from the ink. The protective film 70 is not provided to the non-jet channels 52.

According to this configuration, since the non-jet channels 52 are parts which do not require the protective film 70, there is no trouble of removing the protective film 70 on the part not requiring the protective film. In addition, the problem of the fluffing of the protective film 70 described above does not occur.

The actuator plate 50 in the embodiment has the nozzle peripheral areas Ra on the periphery of the nozzle holes 41*a*, and the coupling areas Rc to which the external boards 45 are coupled. The protective film 70 is not provided to the coupling areas Rc.

According to this configuration, it is possible to prevent the coupling failure with the external board 45.

The head chip 40 according to the embodiment is provided with the intermediate plate 42 which is bonded to the actuator plate 50, and has the communication holes 42*a* communicated with the jet channels 51. The intermediate plate 42 has the step part 43 in the region which separates the nozzle peripheral area Ra and the coupling area Rc from each other.

According to this configuration, when manufacturing the inkjet heads 5, it is possible to perform the alignment with the nozzle plate 41 using the step part 43.

Since the inkjet head 5 and the printer 1 according to the embodiment are each provided with the head chip 40 described above, it is possible to provide the inkjet head 5 and the printer 1 each capable of saving the trouble of removing the protective film from the part not requiring the protective film.

It should be noted that the technical scope of the present disclosure is not limited to the embodiment described above, but a variety of modifications can be applied within the scope or the spirit of the present disclosure.

For example, in the embodiment described above, the description is presented citing the inkjet printer 1 as an example of the liquid jet recording device, but liquid jet recording device is not limited to the printer. For example, the liquid jet recording device can be a facsimile machine, an on-demand printing machine, and so on.

In the embodiment described above, there is described when the recording target medium P is paper, but this configuration is not a limitation. The recording target medium P is not limited to paper, but can also be a metal material or a resin material, and can also be food or the like.

In the embodiment described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiment described above, the description is presented citing the head chip 40 of a side shoot type as an example, but this is not a limitation. For example, it is also possible to apply the present disclosure to a head chip of a so-called edge shoot type which jets the ink from a tip portion in the channel extending direction in the jet channel.

Further, it is also possible to apply the present disclosure to a head chip of a so-called roof shoot type in which the direction of the pressure applied to the ink and the ejection direction of the ink are made the same as each other.

In the embodiment described above, there is described the configuration in which the Z direction coincides with the gravitational direction, but this configuration is not a limitation. For example, the Z direction can be set along a horizontal direction.

In the embodiment described above, there is described the inkjet head 5 of the two-line type in which the nozzle holes 41*a* are arranged in two lines, but this is not a limitation. For example, it is possible to adopt an inkjet head having the nozzle holes 41*a* arranged in three lines or more, or it is possible to adopt an inkjet head having the nozzle holes 41*a* arranged in a single line.

In the embodiment described above, there is described the configuration in which the jet channels 51 and the non-jet channels 52 are arranged in a staggered manner, but this configuration is not a limitation. For example, it is possible to apply the present disclosure to an inkjet head of a so-called three-cycle type in which the ink is jetted in sequence from all of the channels.

In the embodiment described above, there is described the configuration using the chevron type as the actuator plate 50, but this configuration is not a limitation. Specifically, it is possible to use an actuator plate of a monopole type (the polarization direction is unique in the thickness direction).

In the embodiment described above, there is described the configuration in which the actuator plate 50 includes the coupling areas Rc to which the external boards 45 are respectively coupled, but this configuration is not a limitation. For example, the actuator plate 50 is not required to include the coupling area Rc. For example, the coupling area Rc can be provided to a substrate such as a cover plate 60 other than the actuator plate 50.

In the embodiment described above, there is described the configuration in which the head chip 40 is provided with the cover plate 60 which is bonded to the actuator plate 50, and has the ink flow channels Lp1, Lp2 communicated with the jet channels 51, but this configuration is not a limitation. For example, the head chip 40 is not required to be provided with the cover plate 60. For example, the head chip 40 can be provided with a flow channel plate which is bonded to the actuator plate 50, and has an ink flow channel communicated with the jet channels 51.

In the embodiment described above, there is presented the description citing the example in which in the protective film formation step, the intermediate plate 42 having the communication holes 42*a* for exposing the jet channels 51 and the coupling area mask Ma are disposed on the lower surface of the actuator plate substrate AW, and then the protective film 70 is provided to the jet channels 51 through the communication holes 42*a*, but this example is not a limitation. For example, in the protective film formation step, it is possible to dispose a mask having opening parts for exposing the respective jet channels 51 on the lower surface of the actuator plate substrate AW, and then provide the protective film 70 to the jet channels 51 through the opening parts.

In the embodiment described above, there is presented the description citing the example in which in the protective film formation step, the coupling area mask Ma is disposed so as to straddle the lower surface and the side surfaces of the actuator plate substrate AW, and then, the protective film 70 is provided to the jet-channels 51 through the communication holes 42*a*, but this example is not a limitation. For example, in the protective film formation step, it is possible to dispose a mask having opening parts only on the lower surface of the actuator plate substrate AW, and then provide the protective film to the jet channels 51 through the opening parts.

In the embodiment described above, there is presented the description citing the example in which in the protective film formation step, the intermediate plate 42 having the communication holes 42*a* communicated with the jet channels 51 is bonded, as the mask, to the lower surface of the actuator plate substrate AW, and then the protective film 70 is provided to the jet channels 51 through the communication holes 42*a*, but this example is not a limitation. For example, in the protective film formation step, it is possible to dispose a mask other than the intermediate plate 42 on the lower surface of the actuator plate substrate AW, and then provide the protective film 70 to the jet channels 51 through the opening parts of the mask.

In the embodiment described above, there is presented the description citing the example in which in the protective film formation step, in the state in which the intermediate plate 42 is disposed in the nozzle peripheral areas Ra, and the coupling areas Rc are covered with the coupling area mask Ma, the protective film 70 is provided to the jet channels 51 through the communication holes 42*a*, but this example is not a limitation. For example, in the protective film formation step, the protective film 70 can be provided to the jet channels 51 through the communication holes 42*a* in the state in which the intermediate plate 42 is disposed in the nozzle peripheral areas Ra, and the coupling areas Rc are exposed.

In the embodiment described above, there is presented the description citing the example in which in advance of the protective film formation step, the intermediate plate 42 is provided with the step part 43 in the region which separates the nozzle peripheral area Ra and the coupling area Rc from each other, but this example is not a limitation. For example, it is not required to provide the intermediate plate 42 with the step part 43 in advance of the protective film formation step.

In the embodiment described above, there is presented the description citing the example in which the protective film 70 fulfills (A) described below, but this example is not a limitation. For example, it is possible for the protective film 70 to fulfill (B) described below.

(A) The protective film 70 is not provided to the non-jet channels 52.

(B) The protective film 70 is also provided to the non-jet channels 52, and the thickness T2 of the protective film 70 in the non-jet channels 52 is smaller than the thickness T1 of the protective film 70 in the jet channels 51 (T2<T1).

According to this configuration, since the non-jet channels 52 are the parts which do not require the protective film 70, it is possible to save the trouble of removing the protective film 70 in the part not requiring the protective film. In addition, it is possible to prevent the fluffing of the protective film 70 from occurring as described above.

For example, it is possible for the head chip 40 to be provided with the actuator plate 50 having the protective film 70 which satisfies both of (A) and (B) described above.

In the embodiment described above, there is presented the description citing the example in which the protective film 70 is not provided to the coupling areas Rc, but this example is not a limitation. For example, the protective film 70 can be provided to the coupling areas Rc.

In the embodiment described above, there is presented the description citing the example in which the head chip 40 is provided with the intermediate plate 42 which is bonded to the actuator plate 50, and has the communication holes 42*a* communicated with the respective jet channels 51, but this example is not a limitation. For example, the head chip 40 is not required to be provided with the intermediate plate 42.

In the embodiment described above, there is presented the description citing the example in which the intermediate plate 42 is provided with the step part 43 in the region which separates the nozzle peripheral area Ra and the coupling area Rc from each other, but this example is not a limitation. For example, the intermediate plate 42 is not required to have the step part 43.

In the following modified examples, the constituents the same as in the embodiment described above are denoted by the same reference symbols, and detailed description thereof will be omitted.

Figure 22:
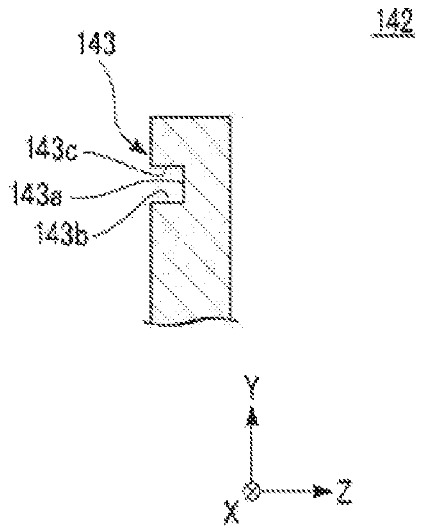
FIG. 22 is a cross-sectional view of a step part of an intermediate plate according to a modified example of the embodiment.

FIG. 22 is a cross-sectional view of a step part of an intermediate plate 142 related to the modified example of the embodiment. FIG. 22 is a cross-sectional view corresponding to FIG. 12.

In the embodiment described above, there is presented the description citing the example (see FIG. 12) in which the step part 43 has the first wall surface 43*a* parallel to the X-Y plane, and the second wall surface 43*b* parallel to the X-Z plane, but this example is not a limitation. For example, as shown in FIG. 22, the step part 143 can be provided with a first wall surface 143*a* parallel to the X-Y plane, and a second wall surface 143*b* and a third wall surface 143*c* parallel to the X-Z plane. In other words, the step part 143 can be formed to have a U shape opening at the −Z side in the cross-sectional view shown in FIG. 22. For example, it is possible for the step part 143 to define a groove which is provided to the lower surface of the intermediate plate 142, and extends in the X direction.

Besides the above, it is possible to replace the constituent in the embodiment described above with a known constituent within the scope or the spirit of the present disclosure. Further, it is also possible to combine any of the modified examples described above with each other.

What is claimed is:

1. A method of manufacturing a liquid jet head chip, comprising:

a substrate preparation step of preparing an actuator plate substrate having a jet channel communicated with a nozzle hole configured to jet liquid, and a non-jet channel which does not jet the liquid; and a protective film formation step of forming a protective film configured to protect an electrode formed on an inner surface of the jet channel from the liquid in a state in which the jet channel is exposed and the non-jet channel is covered, after the substrate preparation step, wherein the actuator plate substrate has a first surface on which a nozzle plate provided with the nozzle hole communicated with the jet channel is disposed, and in the protective film formation step, a mask having an opening part from which the jet channel is exposed is disposed on the first surface of the actuator plate substrate, and then, the protective film is provided to the jet channel through the opening part, and further wherein the actuator plate substrate further has a second surface crossing the first surface, and in the protective film formation step, the mask is disposed so as to straddle the first surface and the second surface of the actuator plate substrate, and then, the protective film is provided to the jet channel through the opening part.

2. The method of manufacturing the liquid jet head chip according to claim 1, wherein in the protective film formation step, an intermediate plate having a communication hole communicated with the jet channel is bonded, as the mask, to the first surface of the actuator plate substrate, and then, the protective film is provided to the jet channel through the communication hole.

3. The method of manufacturing the liquid jet head chip according to claim 2, wherein the first surface of the actuator plate substrate has a nozzle peripheral area on a periphery of the nozzle hole, and a coupling area to which an external board is coupled, and in the protective film formation step, the protective film is provided to the jet channel through the communication hole in a state in which the intermediate plate as the mask is disposed in the nozzle peripheral area, and the coupling area is covered with a coupling area mask as the mask.

4. The method of manufacturing the liquid jet head chip according to claim 3, wherein in advance of the protective film formation step, a step part is provided to the intermediate plate in a region which separates the nozzle peripheral area and the coupling area from each other.

5. A method of manufacturing a liquid jet head chip, comprising:

a substrate preparation step of preparing an actuator plate substrate having a jet channel communicated with a nozzle hole configured to jet liquid, and a non-jet channel which does not jet the liquid; and a protective film formation step of forming a protective film configured to protect an electrode formed on an inner surface of the jet channel from the liquid in a state in which the jet channel is exposed and the non-jet channel is covered, after the substrate preparation step, wherein the actuator plate substrate has a first surface on which a nozzle plate provided with the nozzle hole communicated with the jet channel is disposed, and in the protective film formation step, a mask having an opening part from which the jet channel is exposed is disposed on the first surface of the actuator plate substrate, and then, the protective film is provided to the jet channel through the opening part, and further wherein in the protective film formation step, an intermediate plate having a communication hole communicated with the jet channel is bonded, as the mask, to the first surface of the actuator plate substrate, and then, the protective film is provided to the jet channel through the communication hole.

6. The method of manufacturing the liquid jet head chip according to claim 5, wherein the actuator plate substrate further has a second surface crossing the first surface, and in the protective film formation step, the mask is disposed so as to straddle the first surface and the second surface of the actuator plate substrate, and then, the protective film is provided to the jet channel through the opening part.

7. The method of manufacturing the liquid jet head chip according to claim 5, wherein the first surface of the actuator plate substrate has a nozzle peripheral area on a periphery of the nozzle hole, and a coupling area to which an external board is coupled, and in the protective film formation step, the protective film is provided to the jet channel through the communication hole in a state in which the intermediate plate as the mask is disposed in the nozzle peripheral area, and the coupling area is covered with a coupling area mask as the mask.

8. The method of manufacturing the liquid jet head chip according to claim 7, wherein in advance of the protective film formation step, a step part is provided to the intermediate plate in a region which separates the nozzle peripheral area and the coupling area from each other.

* * * * *